United States Patent
Malka et al.

(10) Patent No.: US 12,322,545 B2
(45) Date of Patent: Jun. 3, 2025

(54) ELECTRODES FOR ELECTROCHEMICAL CAPACITORS BASED ON SURFACE-MODIFIED CARBON

(71) Applicant: EEXION ENERGY LTD., Petach Tikvah (IL)

(72) Inventors: David Malka, Shoham (IL); Doron Aurbach, Bnei Brak (IL)

(73) Assignee: EEXION ENERGY LTD., Petach Tikvah (IL)

( * ) Notice: Subject to any disclaimer, the term of this patent is extended or adjusted under 35 U.S.C. 154(b) by 394 days.

(21) Appl. No.: 17/795,153

(22) PCT Filed: Jan. 25, 2021

(86) PCT No.: PCT/IL2021/050076
§ 371 (c)(1),
(2) Date: Jul. 25, 2022

(87) PCT Pub. No.: WO2021/149063
PCT Pub. Date: Jul. 29, 2021

(65) Prior Publication Data
US 2023/0099022 A1    Mar. 30, 2023

Related U.S. Application Data

(60) Provisional application No. 62/965,912, filed on Jan. 26, 2020.

(51) Int. Cl.
*H01G 11/34* (2013.01)
*H01G 11/52* (2013.01)
*H01G 11/60* (2013.01)
*H01G 11/62* (2013.01)

(52) U.S. Cl.
CPC .......... *H01G 11/34* (2013.01); *H01G 11/52* (2013.01); *H01G 11/60* (2013.01); *H01G 11/62* (2013.01)

(58) Field of Classification Search
None
See application file for complete search history.

(56) References Cited

U.S. PATENT DOCUMENTS

| | | | |
|---|---|---|---|
| 5,115,378 A | 5/1992 | Tsuchiya et al. | |
| 5,554,739 A * | 9/1996 | Belmont | C09D 11/037 534/553 |
| 5,581,438 A | 12/1996 | Halliop | |
| 5,585,999 A | 12/1996 | De Long et al. | |
| 6,472,471 B2 * | 10/2002 | Cooke | C08K 9/04 524/514 |
| 6,522,522 B2 | 2/2003 | Yu et al. | |
| 2002/0171996 A1 * | 11/2002 | Yu | H01G 11/42 361/302 |
| 2007/0246689 A1 * | 10/2007 | Ge | H01G 11/56 252/500 |
| 2015/0085427 A1 * | 3/2015 | Xie | B01D 53/02 156/80 |
| 2017/0275169 A1 * | 9/2017 | Galimberti | C01B 32/21 |
| 2018/0151884 A1 * | 5/2018 | Yushin | H01M 4/134 |
| 2018/0182566 A1 * | 6/2018 | Brousse | H01G 11/86 |
| 2020/0028183 A1 * | 1/2020 | Kim | B01J 21/18 |
| 2023/0099022 A1 * | 3/2023 | Malka | C01B 32/21 361/305 |

FOREIGN PATENT DOCUMENTS

| | | | |
|---|---|---|---|
| CN | 1319627 | 10/2001 | |
| CN | 102323311 | 1/2012 | |
| EP | 0 799 282 | 10/1997 | |
| EP | 2 886 537 | 6/2015 | |
| JP | 2006279003 | 10/2006 | |
| KR | 20190063384 | 6/2019 | |
| WO | WO-2015038612 A1 * | 3/2015 | ............ C02F 1/4604 |
| WO | 2019/168206 | 9/2019 | |

OTHER PUBLICATIONS

Jul. 8, 2024 Search Report issued in European Patent Application No. 21743827.4, pp. 1-16.
Cougnon, C. et al., "Impedance spectroscopy study of a catechol-modified activated carbon electrode as active material in electrochemical capacitor", Jan. 15, 2015., Journal of Power Sources, vol. 274, pp. 551-559 (9 pages).
Le Comte, A. et al., "Spontaneous grafting of 9,10-phenanthrenequinone on porous carbon as an active electrode material in an electrochemical capacitor in an alkaline electrolyte", 2015., J. Mater. Chem. A, vol. 3, pp. 6146-6156 (11 pages).
Assresahegn, B. et al, "Advances on the use of diazonium chemistry for functionalization of materials used in energy storage systems" 2015., Carbon 92, pp. 362-381 (45 pages).
Malka, D. et al., "Improving the Capacity of Electro chemical Capacitor Electrode by Grafting 2-Aminoanthraquinone over Kynol Carbon Cloth Using Diazonium" Oct. 25, 2018., Chemistry Journal of the Electrochemical Society, vol. 165, No. 14, pp. A3342-A3349 (8 pages).
Malka, D. et al., "Catechol-Modified Carbon Cloth as Hybrid Electrode for Energy Storage Devices" Apr. 5, 2019. Journal of the Electrochemical Society, vol. 166, No. 6, pp. A1147-A1153 (7 pages).
International Search Report for PCT/IL2021/050076 dated May 9, 2021 (14 pages).
Written Opinion of the ISA for PCT/IL2021/050076 dated May 9, 2021 (8 pages).

(Continued)

*Primary Examiner* — Dion R. Ferguson
(74) *Attorney, Agent, or Firm* — Nixon & Vanderhye PC

(57) ABSTRACT

A process for preparing surface-modified carbon, comprising adding carbon material to a solution of a reaction product of primary aromatic amine and excess molar amount of nitrite source, and recovering surface-modified carbon bearing redox-active sites. Surface-modified carbon material, electrodes and capacitors based thereon are also provided.

18 Claims, 19 Drawing Sheets

(56) References Cited

OTHER PUBLICATIONS

Oct. 11, 2024 Search Report issued in Chinese Patent Application No. 202180010985.4, pp. 1-3 [machine translation included].
Oct. 12, 2024 Office Action issued in Chinese Patent Application No. 202180010985.4, pp. 1-6 [machine translation included].

* cited by examiner

FIGURE 12A
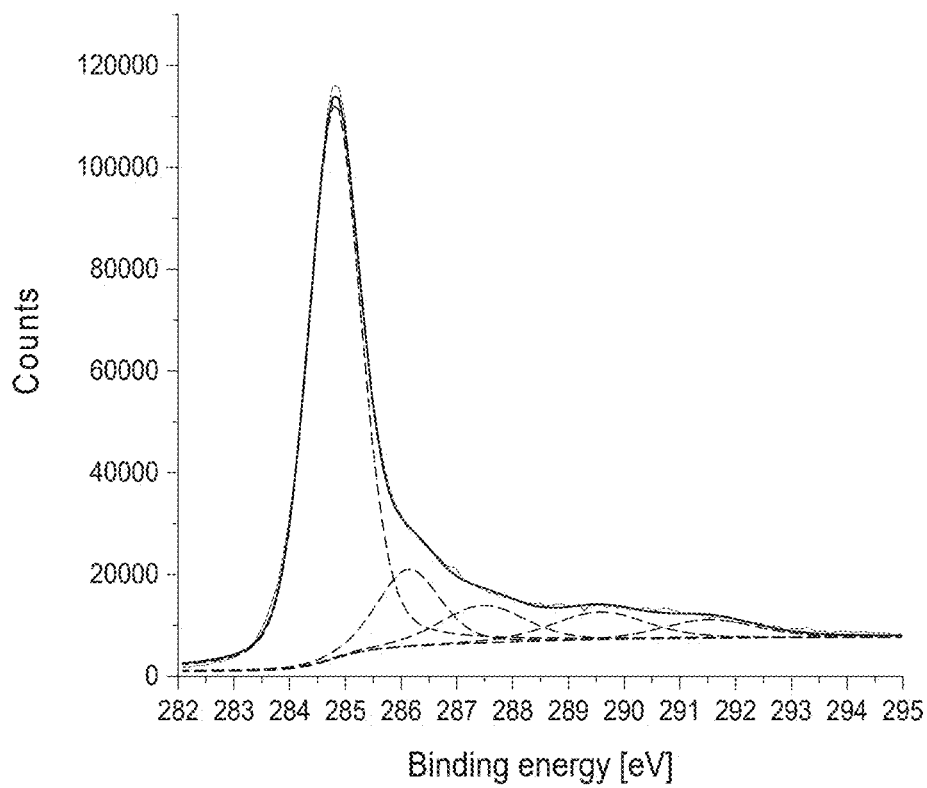
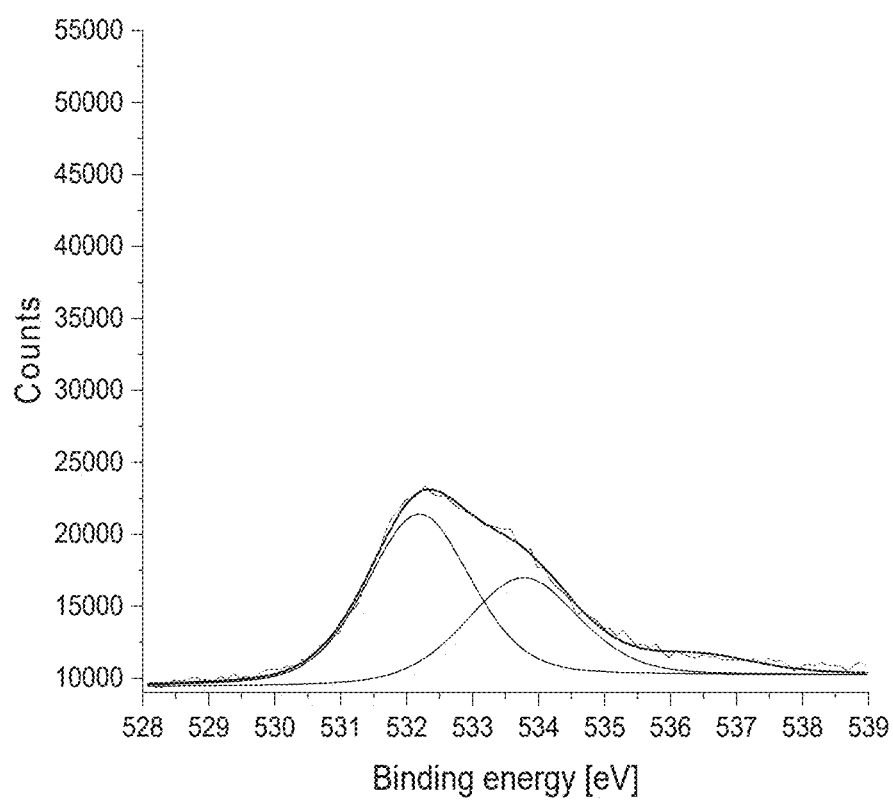
FIGURE 12B

FIGURE 12E
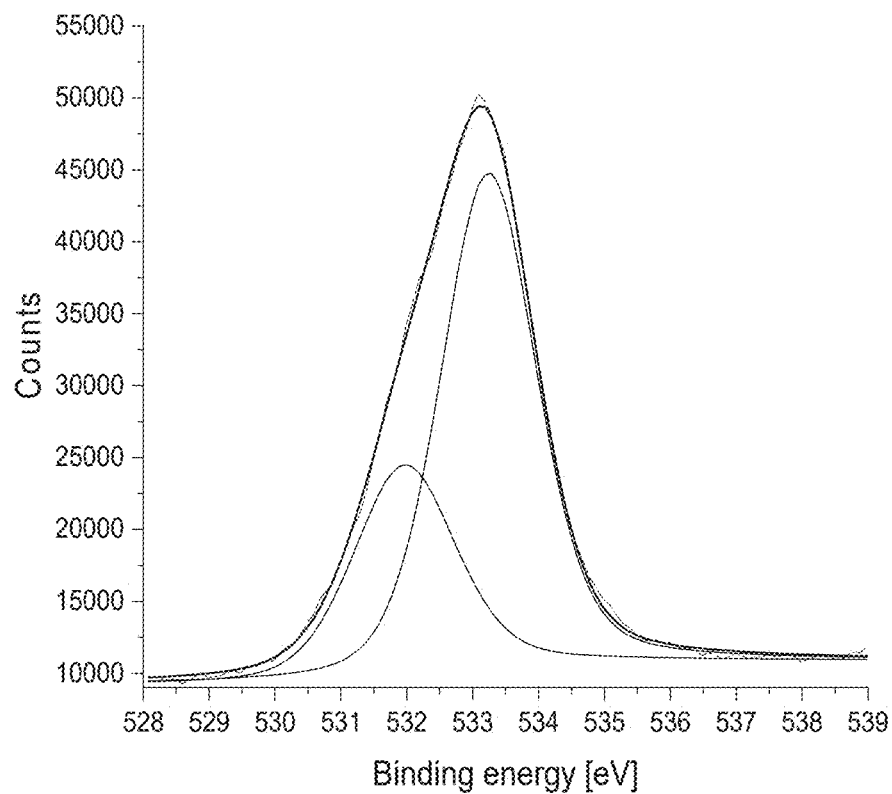
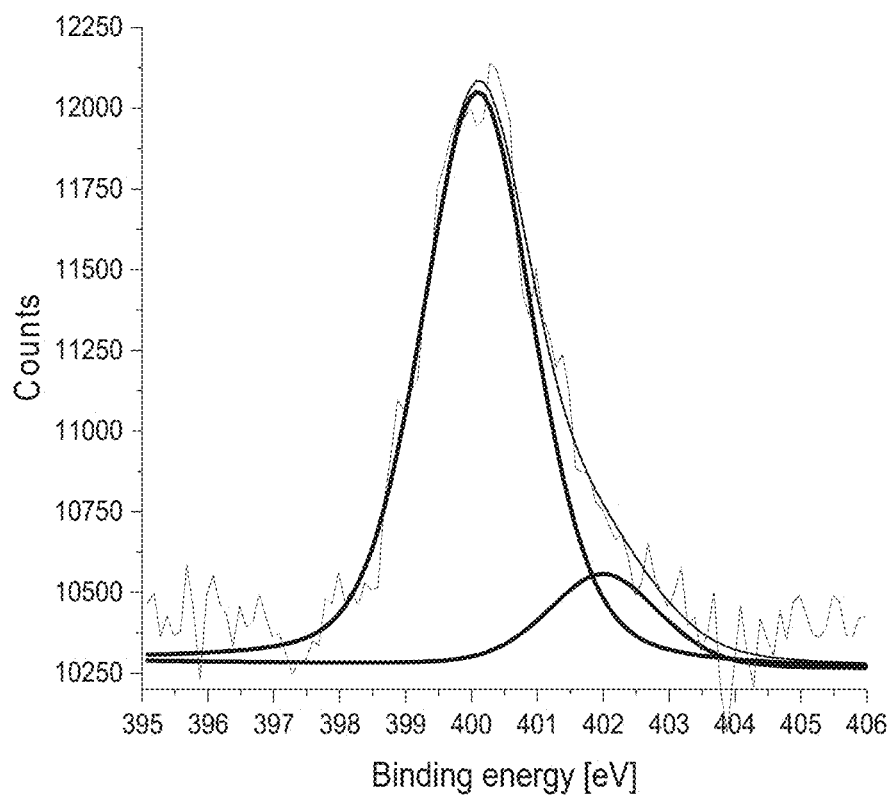
FIGURE 12F

ELECTRODES FOR ELECTROCHEMICAL CAPACITORS BASED ON SURFACE-MODIFIED CARBON

CROSS-REFERENCE TO RELATED APPLICATIONS

This application is the U.S. national phase of International Application No. PCT/IL2021/050076 filed Jan. 25, 2021 which designated the U.S. and claims priority to U.S. 62/965,912 filed Jan. 26, 2020, the entire contents of each of which are hereby incorporated by reference.

BACKGROUND AND SUMMARY

Modification of carbon materials with the aid of diazonium chemistry, to create covalent bonds between the surface of the carbon materials and various functional groups, was reported back in the 1990s. See for example U.S. Pat. Nos. 5,554,739 and 5,851,280 both in the name of Cabot Corporation.

Carbon materials for use in the preparation of electrodes for energy storage devices (e.g., electrochemical capacitors and batteries) could especially benefit from surface modification via diazonium chemistry, to enable incorporation of redox molecules into activated carbon and carbon cloth etc., to improve electrode performance made of such forms of carbon. In U.S. Pat. No. 6,522,522 (Cabot Corporation) the work on diazonium-mediated carbon surface modification has been expanded to electrode manufacture and further efforts in this field were reported in EP 2886537, Assresahegn et al. [Carbon 92 (2015) 362-381], Cougnon et al. [Journal of Power Source, 274 (2015) 551-559], Comte et al. [Journal of Materials Chemistry A 3 (2015), 6146-6156], US 2018/0182566, Malka et al [in Journal of the Electrochemical Society 165 (14) A3342-A3349 (2018) and in Journal of the Electrochemical Society 166 (6) A1147-A1153 (2019)].

There are different approaches to the preparation of the diazonium salt and its reaction with the carbon material. The salt can be formed by the reaction of a primary amine with nitrous acid in aqueous system, e.g., in $NaNO_2/HCl/H_2O$, or in organic solvent, e.g., with the aid of organic nitrite, such as tert-butyl nitrite. The salt may be prepared in advance in solution and used without isolation, as shown in the Working Examples of U.S. Pat. No. 5,554,729. Isolation and purification of the diazonium salt is also possible—see EP 2886537, where a diazonium salt was collected as a tetrafluoroborate salt which was then grafted onto carbon, either electrochemically or chemically.

An elegant approach, which seems well suited to large scale production of electrodes, consists of in-situ synthesis of the diazonium salt from the primary amine precursor, where the salt formation reaction takes place in the presence of the carbon material, with spontaneous/chemical reduction and covalent grafting onto the carbon material. The approach is schematically exemplified by the following scheme:

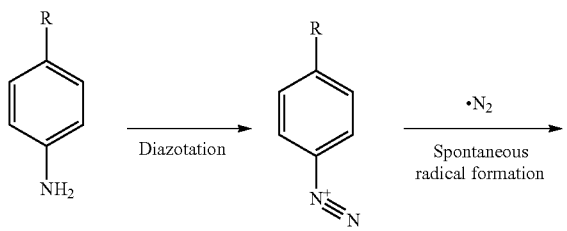

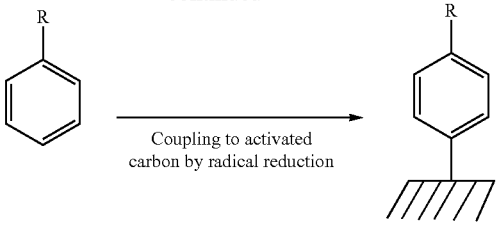

The effectiveness of the synthetic pathway resides in its simplicity: it involves neither preparation of the salt in advance, nor grafting inducement, e.g., no electrochemical reduction of the diazonium.

The conversion of amine to diazonium may take place either in the $NaNO_2/HCl/H_2O$ system or in organic medium.

For example, in U.S. Pat. No. 5,554,739, equimolar amounts of amine and $NaNO_2$ were used, and a cold diazonium solution was added to a suspension of the carbon material.

In U.S. Pat. No. 6,522,522, Example 1, the electrode material was prepared by adding carbon black to a solution of 2-amino-anthraquinone and hydrochloric acid. Sodium nitrite was the last added reagent, i.e., in the form of an aqueous solution which was gradually added to the reaction mixture in a dropwise manner.

In Journal of Power Sources (2015, supra) the carbon was dispersed in acetonitrile and the primary amine (3,4-dimethoxyaniline; 0.3 equivalents vs. carbon) was added with organic nitrite (tert-butyl nitrite, 0.9 equivalents vs. carbon).

In Journal of Materials Chemistry A (2015, supra) the primary amine (2-amino-9,10-phenanthrenequinone) was dissolved in acetonitrile, followed by addition of 1 equivalent of tert-butyl nitrite, the carbon material and then additional 2 equivalents of tert-butyl nitrite (two equal portions, over 30 minutes).

In US 2018/0182566, Example 1, the organic nitrite (tert-butyl nitrite) was dissolved in acetonitrile and the solution was added dropwise to a solution of the primary amine (4-aminobenzoic acid) and carbon fibers. The molar ratio 4-aminobenzoic acid:nitrite was 1:3.

In Journal of the Electrochemical Society (2018, supra and 2019, supra) the primary amine (2-amino-anthraquinone and 3,4-dimethoxyaniline, respectively) was dissolved in acetonitrile, 1 equivalent of tert-butyl nitrite was added, followed by addition of the carbon material and lastly, another equivalent of the tert-butyl nitrite.

It is seen that despite the straightforwardness of the process, there are different ways to manipulate the diazonium salt formation reaction and its covalent grafting onto carbonaceous electrode materials.

BRIEF DESCRIPTION OF THE DRAWINGS

FIGS. 12A-12F: X-ray photoelectron spectra of non-modified carbon cloth (FIGS. 12A-C) and 3, 4, 5-trimethoxyaniline modified carbon cloth (FIG. 12D-F) for C 1s (FIGS. 12A-12B), O 1s (FIGS. 12C-12D) and N 1s (FIGS. 12E-12F) respectively.

DETAILED DESCRIPTION

Figure 1:
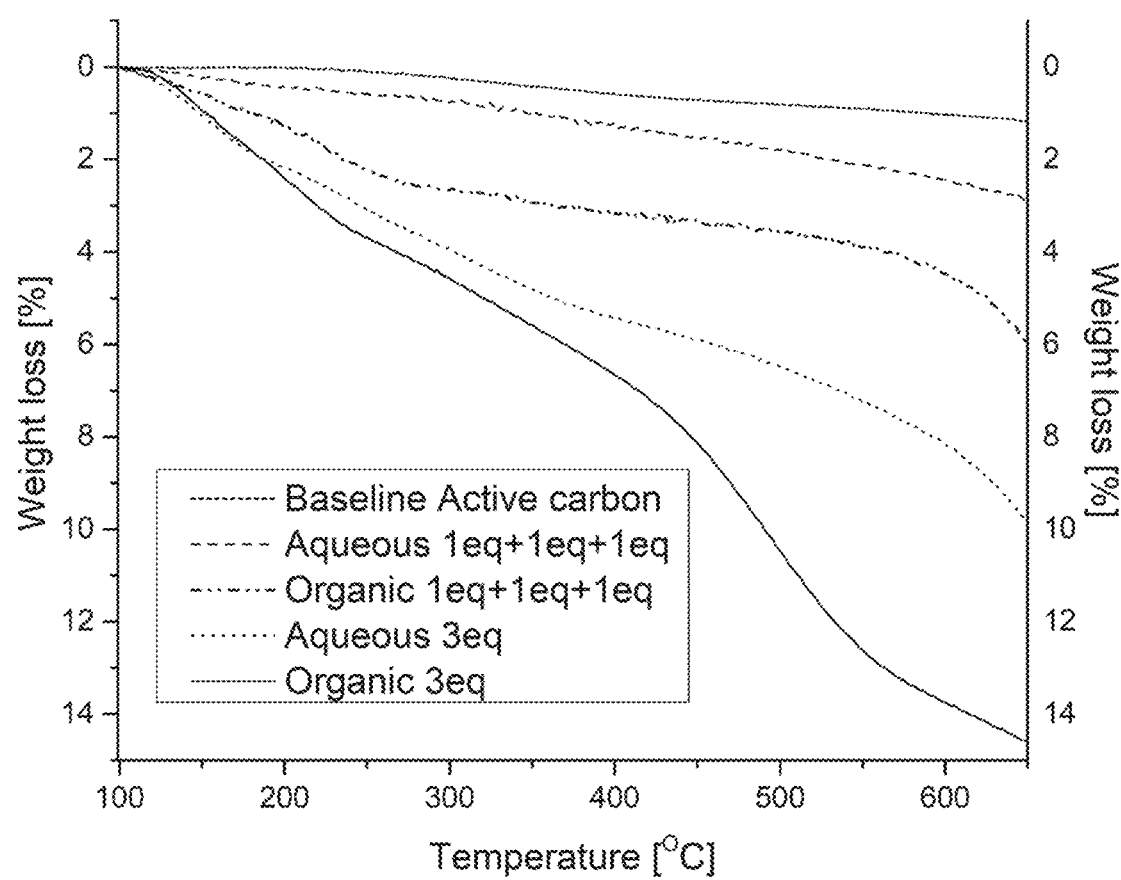
FIG. 1: TGA thermogram of the inventive, comparative and control carbon materials prepared in examples 1-4.

We have now found that it is possible to increase the degree of grafting of redox molecules onto carbon materials through the diazonium chemistry by careful selection of reaction conditions, namely, by combining a carbon material with a solution of a reaction product of a primary aromatic amine and excess nitrite. That is, primary aromatic amine is allowed to react with excessive molar amount of nitrite source in solution and subsequently this solution is combined with the carbon material. Owing to the presence of excess nitrite, the amount of unreacted amine is minimized and as a result amine absorption of the carbon surface is eliminated, leaving the surface accessible to covalent grafting of the diazonium.

Experimental work conducted in support of this invention indicates that the proposed permutation of the process leads to favorable results. As shown below, 2-amino-anthraquinone, a commonly used benchmark in the study of diazonium chemistry to improve electrode performance [see also U.S. Pat. No. 6,522,522 and Journal of the Electrochemical Society (2018, supra)] was combined with activated carbon in an organic solvent. In the experimental work reported below, the nitrite source was supplied to the reaction mixture in two different ways:

nitrite in excess to 2-amino-anthraquinone is present in the reaction mixture before addition of carbon material; and nitrite in equimolar molar amount relative to 2-amino-anthraquinone is present in the reaction mixture before addition of carbon material; after the addition of carbon material is completed, the remaining amount of nitrite is charged to the reaction mixture.

In the study reported below, the total amount of nitrite was 3 times the molar amount of 2-amino-anthraquinone. The excessive nitrite amount was either 1) added in its entirety to a solution of 2-amino-anthraquinone before carbon addition, or 2) divided into three equal portions which were sequentially charged to the solution at 30 minutes intervals, with the carbon being added after the first portion of nitrite. Order of addition of reactants to the reaction vessel is set out below:

1) 2-amino-anthraquinone→3 eq. nitrite→carbon material
2) 2-amino-anthraquinone→1 eq. nitrite→carbon material→1 eq. nitrite→1 eq. nitrite A product consisting of the surface-modified carbon material was collected and tested by thermogravimetric analysis (TGA) to determine change in mass with respect to temperature and measure the amount of quinone derivative grafted onto the carbon surface by the methods set out above. The results shown in FIG. 1 indicate the increased grafting level achieved when nitrite is present in excess in the reaction mixture before addition of the carbon material. The same trend was observed independently of the reaction medium (aqueous or organic).

Accordingly, one aspect of the invention is a process for preparing surface-modified carbon, comprising adding carbon material to a solution of a reaction product of primary aromatic amine and excess molar amount of nitrite source, and recovering surface-modified carbon bearing redox-active sites.

The primary aromatic amine which takes part in the reaction is of the formula $(RED)_n\text{-Ar}-(NH_2)_m$ in which:

Ar represents an aromatic or conjugated system comprising one or more rings;

m is 1 or 2;

RED represents a functional group capable of undergoing redox reactions, optionally in a protected form, wherein RED is either attached to one or more rings of Ar, or forms part of such rings;

n is the number of RED groups in the primary aromatic amine ($1 \leq n \leq 5$, e.g., n=1, 2 or 3).

The surface-modified carbon is recovered from the reaction mixture, protecting groups—if present—are removed, and the product is processed and shaped into an electrode, which could be assembled to create storage energy devices as described below.

Diazonium salt formation reaction and grafting onto carbon can take place in an aqueous acidic environment, with the aid of inorganic nitrite source, such as alkali nitrite, e.g., sodium nitrite or potassium nitrite, whereby nitrous acid is generated in situ to drive the reaction. The acidic environment is created by strong mineral acid, for example, hydrochloric acid, sulfuric acid and nitric acid. The preferred system is $NaNO_2$/HCl in water. The reaction proceeds well at pH in the range from 0 to 6, e.g., 0 to 3, at temperature in the range from 10 to 70° C., e.g., room temperature. To accomplish grafting, a reducing agent capable of liberating nitrogen ($N_2$) from the diazonium ion and generate the corresponding aryl radical is also present in the reaction mixture.

Alternatively, the salt formation reaction and grafting onto carbon takes place in a non-aqueous system, i.e., in an organic solvent. Suitable organic solvents are inert solvents capable of solubilizing the amine and organic nitrite. Polar aprotic solvents, such as acetonitrile, acetone, dimethylformamide, dioxane and dioxolane can be used. The nitrite source is alkyl nitrite, wherein the alkyl group is straight or branched C2-C7 chain, such as ethyl nitrite, tertbutyl nitrite and isopentyl nitrite. In the organic system, reduction of the diazonium to the corresponding aryl radical occurs spontaneously, i.e., no need in application of electric potential or addition of a chemical reductant to force diazonium reduction and its grafting.

The first step of the process is the dissolution of a primary aromatic amine in the aqueous or organic media described above. The primary aromatic amine is of the formula $(RED)_n$-Ar—$(NH_2)_m$. The aromatic core Ar comprises one or more aromatic rings, including heteroaromatic rings. When two or more rings are present in Ar, these rings may be fused together to form polycyclic aromatic system or may be bridged. Thus, the primary aromatic amine of the formula $(RED)_n$-Ar—$(NH_2)_m$ includes:

aniline substituted with $(RED)_n$ groups;

conjugated polycycles composed of fused six-membered rings, bearing the amine functionality and substituted with $(RED)_x$ groups, for example, quinones, e.g., quinones derived from naphthalene (naphthoquinone), anthracene (anthraquinone) and phenanthrene (phenanthrenequinone);

aromatic polycycles composed of fused six-membered and five-membered heteroaromatic rings, e.g., nitrogen or oxygen-containing aromatic rings, for example, pyridine or pyrimidine rings fused to imidazole ring, bearing the amine functionality and substituted with $(RED)_n$ groups, or having the $(RED)_n$ incorporated in Ar as part of a ring system;

amino-substituted biphenyl-related systems, with a linker connecting the phenyl rings.

Turning now to the definition of $(RED)_n$ functionalities which ultimately account for the redox-active sites in the surface-modified electrode carbon material, RED represents a redox group attached to a ring carbon atom, such as:

=O (oxo group);

—OH (hydroxyl group), or protected hydroxyl such as —$OP_1$, where $P_1$ indicates hydroxyl protecting group such as alkyl (e.g., methyl), —$Si(R_1)_3$ where $R_1$ is alkyl, especially methyl. Namely, the hydroxyl can be protected in the form of the corresponding methyl ether —$OCH_3$ or trimethylsilyl ether —O—$Si(CH_3)_3$, or —$OCH_2OCH_3$ (where the hydroxyl is protected as methoxymethyl ether);

—SH (thiol group) or a protected thiol,

—C(O)OH or a salt thereof, e.g., an alkali salt thereof, or a protected carboxylic acid —$C(O)OP_2$ where $P_2$ indicates carboxylic acid protecting group, e.g., the acid can be protected as an alkyl ester, specifically methyl ester;

—$SO_3H$ or a salt thereof, e.g., alkali salt thereof;

It should be noted that when two or more RED groups are present in the primary aromatic amine, then these groups may be the same or different. Below we present several preferred classes of the $(RED)_x$-Ar—$(NH_2)_n$ starting materials.

One class of $(RED)_n$-Ar—$(NH_2)_m$ compounds for use in the invention consists of $(RED)_n$-substituted anilines, which enable the incorporation of redox active groups such as thiol, sulfonic acid and carboxylic acid onto the carbon surface (in the schemes shown below the carbon surface is indicated by the "comb-like" structure):

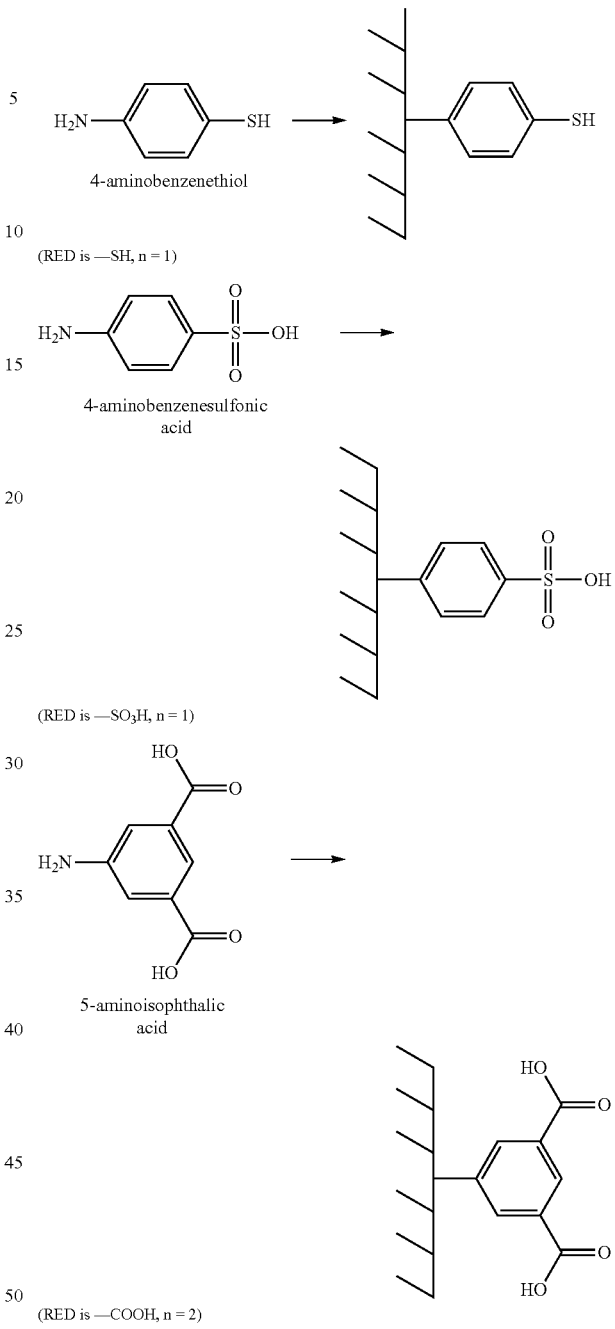

The grafting of the $(RED)_n$-substituted anilines depicted above onto carbon surfaces through the diazonium pathway proceeds efficiently in organic solvents. For example, these aniline derivatives are quite soluble in acetonitrile.

Another preferred class of $(RED)_n$-Ar—$(NH_2)_m$ compounds for use in the invention consists of $(OP_1)_n$-substituted anilines (i.e., Ar is benzene ring, m=1, RED is in a protected form). We have found that it is possible to graft one or more hydroxyl groups to carbon surface, e.g. up to three hydroxyl groups per aromatic ring, with the aid of suitable protecting groups. For example, through protection of the hydroxyl groups as corresponding ethers, e.g., methyl ethers. The approach is illustrated below starting from (commercially available) 3,4,5-trimethoxyaniline. Grafting to the carbon surface through the diazonium pathway takes place in an organic solvent (e.g., acetonitrile), followed by isolation of the surface-modified carbon and cleavage of the protecting group(s) to generate the hydroxyl redox functionalities as shown below:

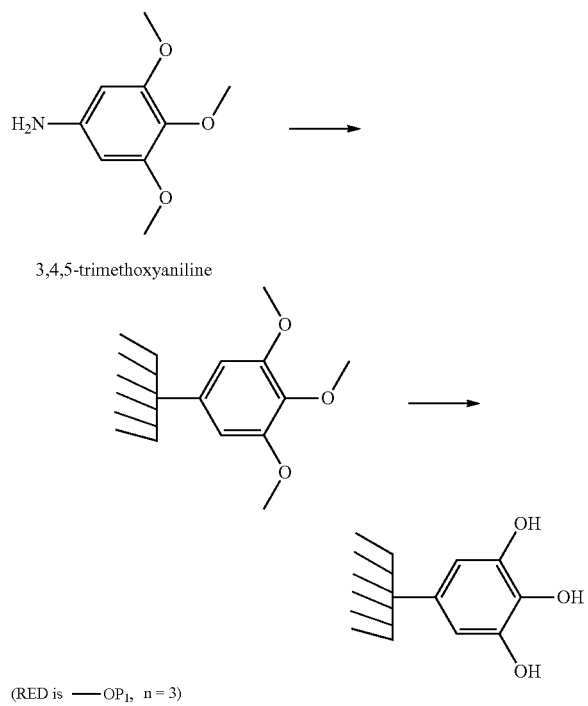

3,4,5-trimethoxyaniline (RED is —OP$_1$, n = 3)

Another preferred class of (RED)$_n$-Ar—(NH$_2$)$_m$ compounds for use in the invention consists of (OP$_1$)$_{n1}$—(COOP$_2$)$_{n2}$—Ar—(NH$_2$)$_m$, where Ar indicates benzene ring, e.g., (OP$_1$)$_{n1}$—(COOP$_2$)$_{n2}$-substituted anilines, where OP$_1$ is protected hydroxyl, COOP$_2$ is protected carboxylic acid, and n$_1$ and n$_2$ are independently 1 or 2. For example, commercially available (OH)$_{n1}$—(COOH)$_{n2}$-substituted anilines are treated in an organic solvent to protect the hydroxyl as silyl ether (e.g., using the reagent (R$_1$)$_3$Si—Cl, for example where R$_1$ is methyl, to protect the hydroxyl as trimethylsilyl ether, such that P$_1$ is preferably —Si(CH$_3$)$_3$) and the carboxylic acid as alkyl ester (e.g., using a suitable alcohol, e.g., methanol to form the corresponding methyl ester, such that P$_2$ is preferably —CH$_3$). The protection reactions can be carried out successively with isolation and purification of an intermediate following the first protection reaction. However, a more convenient approach consists of one pot synthesis, where the starting material (OH)$_{n1}$—(COOH)$_{n2}$-substituted aniline is reacted with (R$_1$)$_3$Si—Cl and R$_1$OH (R$_1$ is independently alkyl) to afford the corresponding protected aniline derivative:

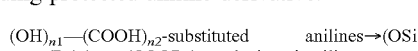

(OH)$_{n1}$—(COOH)$_{n2}$-substituted anilines→(OSi(R$_1$)$_3$)$_{n1}$—(COOR$_1$)$_{n2}$-substituted anilines The one-pot synthesis to form the protected aniline derivative takes place in an organic solvent such as acetonitrile, dry tetrahydrofuran and dimethylformamide on addition of excess of (R$_1$)$_3$Si—Cl and R$_1$OH. The protected aniline derivative is separated from the reaction mixture (e.g., by concentration and filtration) and purified by crystallization. The purified (OP$_1$)$_{n1}$—(COOP$_2$)$_{n2}$-substituted aniline then proceeds to the diazonium salt formation reaction according to the invention, e.g., by dissolution in an organic solvent, reaction with excess nitrite and grafting to the carbon. Isolation of the carbon and cleavage of the protecting groups by techniques described below to restore the hydroxyl and carboxylic acid redox active functionalities ultimately lead to the desired surface-modified carbon product as illustrated below:

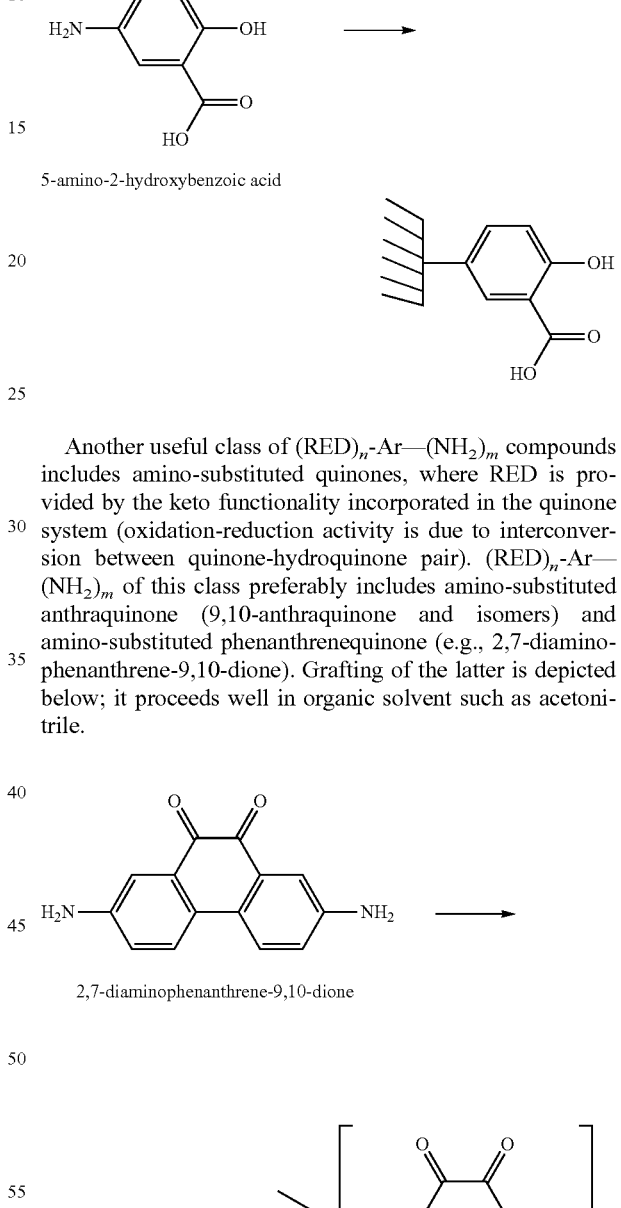

5-amino-2-hydroxybenzoic acid

Another useful class of (RED)$_n$-Ar—(NH$_2$)$_m$ compounds includes amino-substituted quinones, where RED is provided by the keto functionality incorporated in the quinone system (oxidation-reduction activity is due to interconversion between quinone-hydroquinone pair). (RED)$_n$-Ar—(NH$_2$)$_m$ of this class preferably includes amino-substituted anthraquinone (9,10-anthraquinone and isomers) and amino-substituted phenanthrenequinone (e.g., 2,7-diaminophenanthrene-9,10-dione). Grafting of the latter is depicted below; it proceeds well in organic solvent such as acetonitrile.

2,7-diaminophenanthrene-9,10-dione

Yet another class of (RED)$_n$-Ar—(NH$_2$)$_m$ consists of amino-substituted biphenyl-based systems, $_2$HN—C$_6$H$_5$—Z—C$_6$H$_5$—NH$_2$, where Z indicates a linker incorporating redox active fragment such as disulfide. One example is shown below:

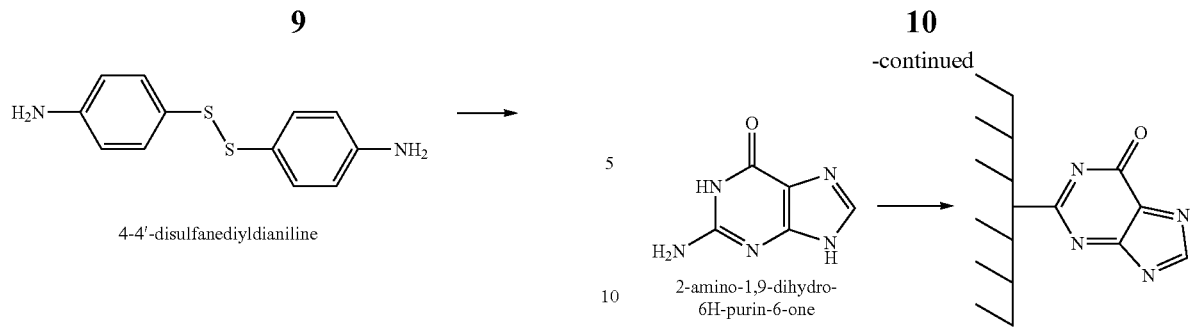

4-4'-disulfanediyldianiline

Amino-substituted heterocyclic aromatic compounds, e.g., consisting of fused six-membered and five-membered heterocyclic rings, having ~N=CH—NH~ structural motif as part of the ring system, e.g., purines:

7H-purine (amino group may be attached at position 2 or 6 of the purine), and a corresponding conjugated derivative of amino-substituted heterocyclic aromatic compounds where —CH= in a fused six-membered aromatic ring is replaced with —C(O)— functionality, for example, the 6-one derivative of purine, forms another class of useful compounds to be grafted onto carbon via the diazonium pathway:

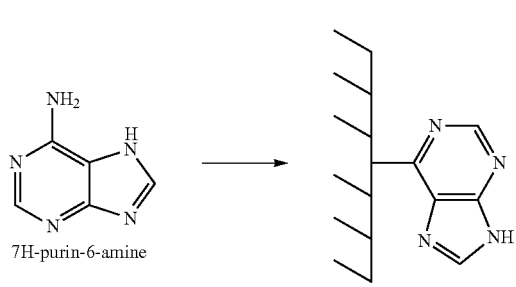

7H-purin-6-amine 2-amino-1,9-dihydro-6H-purin-6-one

The amino-substituted heterocyclic aromatic compounds depicted above are amenable to diazonium formation in aqueous HCl.

Turning to the process according to the invention, the $(RED)_n$-Ar—$(NH_2)_m$ starting material described above (optionally in a protected form) is dissolved in acidic aqueous media or organic solvent. Next, the nitrite salt is added in excess to the aqueous/non-aqueous solution of the primary aromatic amine. A minimum excess is about 1 molar percent (1.01 molar equivalents of nitrite source), e.g., at least 10 molar percent (1.10 molar equivalents of nitrite source), and preferably even substantially higher excess, up to 50 molar percent (1.50 molar equivalents of nitrite source), up to 100 molar percent (2.0 molar equivalents of nitrite source). Preferred excess is from 100 to 200 molar percent, e.g., from 2 to 3 molar equivalents of nitrite source are added.

As mentioned earlier, when the reaction takes place in acidic aqueous solution, e.g., in hydrochloric acid, a reducing agent is beneficial to promote the reduction of the diazonium ion to nitrogen gas ($N_2$) and aryl radical. A reducing agent can therefore be added to the aqueous reaction mixture (e.g., consisting of a solution of the primary aromatic amine in $NaNO_2/HCl/H_2O$), for example, metals such as iron, zinc, copper and nickel, which can be added to the solution in the form of a powder etc. As an alternative to the use of metallic reductants, one may consider the use of reducing agents such as hypophosphorous acid ($H_3PO_2$) and ascorbic acid.

The last added reagent is the carbon material to be modified. Suitable carbon materials which can be surface-modified by the present invention include activated carbon, carbon fiber, carbon cloth and graphite powder. The carbon substrate should contain mostly SP2 hybridized carbon with as much surface area possible and without heteroatoms or metallic contaminations. For example, active carbon cloth from Kynol® with surface area of 1500-2000 $m^2/g$ can be used. The mass ratio between the carbon material and $(RED)_n$-Ar—$(NH_2)_m$ is in the range of 10:0.1 to 0.1:10 respectively, e.g., 1:3-3:1, 2:1-1:2, around 1:1.

Following the addition of the carbon material, the reaction mixture is held for some time, e.g. at least 2 hours. The surface-modified carbon is then separated from the reaction mixture, e.g., by filtration, treated in organic solvents (e.g., DMF, methanol and acetone) to remove excess reagents (i.e., removal of adsorbed molecules) and dried.

As mentioned above, in some cases, the molecule is grafted onto the carbon as an electrochemically inactive form. That is, a protected derivative, which lacks redox activity, is used at the synthesis/grafting step. Consequently, the as-grafted molecule needs to be transformed into the redox active compound, e.g., by the removal of protecting groups. One typical example is that of redox active hydroxy-substituted aromatic compounds, which are loaded onto the carbon in a protected form, i.e., as an etherified derivative.

Namely, $(OP_1)_n$—Ar—$NH_2$, such as methoxy-substituted anilines, are used in the grafting step, and are subsequently transformed into the redox active $(HO)_n$—Ar-grafted moieties.

The transformation can be achieved either chemically (e.g., with the aid deprotection agents capable of cleaving the protecting groups) or electrochemically.

Transformation of the as-grafted molecule to its active form by a chemical removal of protecting groups is carried out following separation the surface-modified carbon from the reaction mixture. The surface-modified carbon is suspended in an inert organic solvent such as dichloromethane and cleavage of protecting groups is accomplished with the aid of suitable reagents. For example, dealkylation can be achieved in dichloromethane with the aid of boron tribromide (sold as solution in dichloromethane) which cleaves the methoxy group to form the hydroxyl at room temperature; deprotection of silyl ether is done with a fluoride source such as $nBu_4NF$ (tetra-butyl ammonium fluoride; TBAF) or KF.

Transformation of the as-grafted molecule to its redox active form through an electrochemical removal of protection groups, e.g., to convert ether groups into hydroxyls, is done under the conditions reported in Journal of Power sources (2015, supra). Namely, the surface-modified carbon is used (and if needed, shaped into, with the aid of a binder and conduction-increasing additives) as a working electrode, in a three-electrode set-up, consisting of said working electrode, excess activated carbon as counter electrode and, e.g., saturated calomel electrode (SCE) as a reference electrode. Irreversible transformation of $(OP_1)_n$—Ar-grafted moieties (e.g., $P_1$ is $CH_3$) into the redox active $(HO)_n$—Ar-grafted moieties is accomplished in 1-10 M sulfuric acid or 1-10 M HCl electrolyte solution at a scan rate in the range of 1 mV/s to 10 mV/s across ΔV range of 0-1 V vs SCE. A two-electrodes set up with a well-defined mass balance and voltage window can also be used to oxidize large amounts on a commercial scale.

The surface modified carbon described herein, with redox active compounds covalently bound to the surface, is useful as electrode material for electrochemical capacitors. Cyclic voltammograms measured using three electrode set-up with the surface modified carbon serving as a working electrode, unmodified carbon as a counter electrode and a saturated calomel electrode (SCE) as a reference electrode in concentrated hydrochloric acid, sulfuric acid and potassium hydroxide electrolyte solutions (recorded at various rate s from 2 mV/s to 20 mV/s) indicate the effect generated by the grafted molecule, changing the electric double layer (EDL) capacitor behavior to incorporate faradaic contribution of the redox molecule on the surface. Voltammograms exhibiting peaks indicative of the presence of pronounced redox sites were recorded, e.g., for:

1) trihydroxybenzene-grafted carbon electrode material:

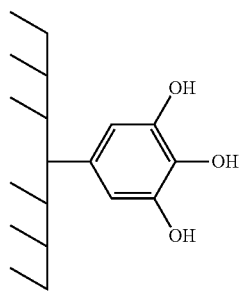 [SMILES: CCC(C)C(C)C(c1cc(O)c(O)c(O)c1)C(C)C(C)CC]

3) 9,10-phenanthrenequinone-grafted carbon electrode material:

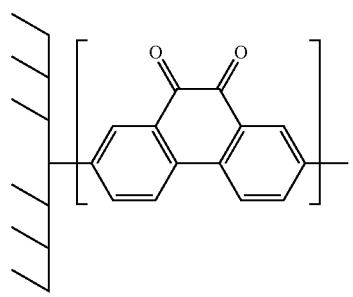

3) 1,9-dyhydro-6H-purine-6-one-grafted carbon electrode material:

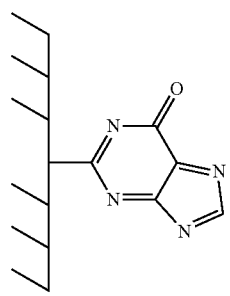 [SMILES: CCC(C)C(C)C(C1=NC(=O)C2=NC=NC2=N1)C(C)C(C)CC]

4) 2-hydroxybeznoic acid-grafted carbon electrode material:

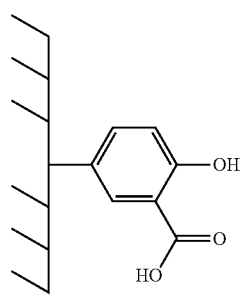 [SMILES: CCC(C)C(C)C(c1ccc(O)c(C(=O)O)c1)C(C)C(C)CC]

The invention therefore also relates to carbon material (e.g., activated carbon, carbon fiber, carbon cloth and graphite powder) which is surface-modified with the molecules described herein, in particular the 1), 2), 3) and 4) variants mentioned immediately hereinabove, and to an electrode comprising such carbon.

The invention also relates to surface-modified carbon with the molecules described above, e.g., the 1), 2), 3) and 4) variants, wherein thermogravimetric analysis of a sample of said surface-modified carbon conducted under nitrogen atmosphere with a heating rate of 10 or 20° C. per minute, up to temperature of 450°, indicates weight loss of at least 15%, e.g., at least 20%; from 20 to 30%, from 30 to 40%, from 40 to 50%, from 50 to 60%, from 60 to 70%, from 70 to 80%, from 80 to 90%, or from 90 to 100%, indicative of high loading of the grafted molecules to the carbon material.

Surface-modified carbon, wherein trihydroxybenzene is grafted to the carbon, showing weight loss in TGA of at least 15%, e.g., at least 20%, for example, from 20 to 50%, e.g., from 15 to 30%, up to a temperature of 450° C.; and surface-modified carbon, wherein 9,10-phenanthrenequinone is grafted to the carbon, showing weight loss in TGA of at least 20%, e.g., at least 30%, for example, from 30 to 50% (grafted to the carbon using the 2,7-diamino-phenanthrene-9,10-dione); form specific aspects of the invention.

Electrodes based on the surface-modified carbon of the invention are prepared by techniques known in the art. There are two main approaches to electrode preparation:
- monolithic electrode made from active carbon fiber or cloth, without further additives; i.e., monolithic electrodes are punched and shaped with desired dimensions; and
- composite electrode, e.g., when active carbon powders are used, and a composite paste is prepared with the modified carbon powder, a binder (PTFE suspension in water/PVDF etc.) and, e.g., carbon black to improve conductivity.

For example, to prepare composite electrodes, ingredients are combined in concentration ranges of:
active mass (modified carbon of the invention): 70%-95%
a binder (dry weight): 4%-15%
conductive additives (carbon black, carbon nanotubes): 0%-20%

All the ingredients are mixed thoroughly with a solvent that dissolves the binder, usually alcohol (isopropanol or ethanol) or NMP (n-methyl pyrrolidone), to form an homogeneous slurry, which is then partially dried to form a paste like texture. The composite electrode is then rolled in a rolling machine to the desired electrode width.

The electrode of the invention can be assembled to create unsymmetrical electrochemical capacitor for use as an energy storage device. The invention therefore also relates to a capacitor comprising a pair of spaced apart electrodes, a separator disposed in the space between said electrodes and an electrolyte solution (e.g., HCl, $H_2SO_4$ or KOH solution) wherein one of said electrodes comprises the surface-modified carbon described herein.

Experimental results reported below indicate that some electrode materials of the invention, such as 9,10-phenanthrenequinone-grafted carbon electrode (obtained using the 2,7-diamino-phenanthrenequinone, as shown below):

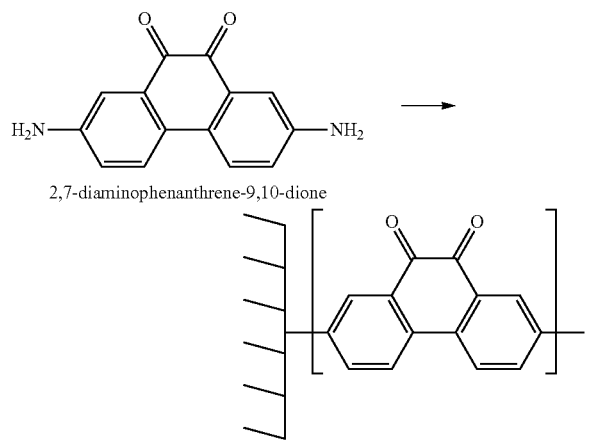

perform well in electrochemical capacitors with electrolyte solutions containing salts as opposed to protic acids and hydroxide bases, namely, made of salts dissolved in water, e.g., halides salts, such as bromide and chloride salts, e.g., alkali halides (for example, sodium bromide) or ammonium halide, and other halide metal salts (for example, bivalent halides, such as barium chloride) and sulfates, e.g., alkali sulfates. The concentration of such an electrolyte solution is >10% by weight, up to, including, the saturation limit.

Capacitors are assembled by methods known in the art, e.g., symmetric or asymmetric capacitors with monolithic/composite electrodes as described above. Electrodes are placed in contact with current collectors (e.g., formed from carbon sheets, metal foils, or conductive polymers), or terminals of the cell and soaked with the electrolyte solution. Examples of separators placed in the capacitor to separate the two electrodes from each other include cellulose separator (e.g., from NKK), plastic such as high-density polyethylene (HDPE) membranes or porous fabrics, and the like. An individual cell is tightly closed to make good contact between each electrode and its current collector and pressed onto the separator to form a compact structure with low resistivity. Bipolar configuration, where individual cells are stacked together, can be used to increase output voltage. Electrochemical capacitors are described, for example, in U.S. Pat. Nos. 5,115,378, 5,581,438, 5,585,999 and 6,522,522, showing overall electric double layer capacitor design suitable for the present invention.

EXAMPLES

Thermogravimetric analyses (TGA) were conducted using a TGA-GC-MS (EI/CI) Clarus 680/Clarus SQ 8C instrument by Perkin Elmer under to evaluate the thermal stability of the grafted moieties. 6.5 mg of modified carbon cloth electrode was subjected to a TGA oven, with a heating rate of 10 or 20° C./min from 25 to 900° C. under nitrogen atmosphere (balance purge 80 mL/min; sample purge 20 mL/min) in alumina crucibles.

Cyclic voltammetry (CV) measurements were carried out in a BioLogic VSP potentiostat and analyzed using ECLAB software.

Examples 1-2 (of the Invention) and 3-4 (Comparative)

A set of experiments was conducted to investigate the effect nitrite present in excess to 2-aminoanthraquinone in the reaction mixture, before addition of carbon.

The experiment of Example 1 took place in organic system: Dissolve 0.5 gr of 2-aminoanthraquinone (2.2 mmol) in 350 ml ACN until complete dissolution of the amine derivative. Add 3 eq of tertbutyl nitrite 0.69 gr (1 ml 90% solution). After 5 minutes, add 1 eq of active carbon cloth. Stir the reaction mixture for 24 hours; then filter the reaction mixture and wash with aliquot amounts of acetonitrile, DMF, acetone and methanol. Dry the modified carbon at 100° C. for 4 hours.

The experiment of Example 2 took place in aqueous system: Dissolve 0.5 gr of 2-aminoanthraquinone (2.2 mmol) in 400 ml 2M HCl until complete dissolution of amine derivative. Add 3 eq of sodium nitrite 0.455 gr. After 5 minutes add 1 eq of active carbon cloth. Stir the mixture for 24 hours; then filter the reaction mixture and wash with aliquot amount of acetonitrile DMF acetone and methanol. Dry the modified carbon at 100° C. for 4 hours.

The experiment of Example 3 took place in organic system: Dissolve 0.5 gr of 2-aminoanthraquinone (2.2 mmol) in 350 ml ACN until complete dissolution of the amine derivative. Add 1 eq of tertbutyl nitrite 0.23 gr (0.33 ml 90% solution), followed by 1 eq of active carbon. Stir the reaction mixture for 30 min and add another 1 eq of tertbutyl nitrite 0.23 gr (0.33 ml 90% solution), stir for 30 min, then add another 1 eq of tertbutyl nitrite 0.23 gr (0.33 ml 90% solution) and stir for 24 hours. Filter the reaction mixture and wash with aliquot amount of acetonitrile, DMF, acetone and methanol. Dry the modified carbon at 100° C. for 4 hours.

The experiment of Example 4 took place in aqueous system: Dissolve 0.5 gr of 2-aminoanthraquinone (2.2 mmol) in 400 ml 2M HCl until complete dissolution of the amine derivative. Add 1 eq Sodium nitrite 0.15 gr followed by 1 eq of active carbon. Stir the mixture for 30 min, add another 1 eq Sodium nitrite 0.15 gr, stir the mixture for 30 min and add another 1 eq Sodium nitrite 0.15 gr and stir for 24 hours. Filter the reaction mixture and wash with aliquot amount of acetonitrile, DMF, acetone and methanol. Dry the modified carbon at 100° C. for 4 hours.

Next, each sample was placed in the thermogravimetric analyzer and the thermogravimetric curves showing change in mass with respect to temperature are presented in FIG. 1 (under nitrogen at a temperature rate of 20° C./min). Mass loss is due to elimination and/or decomposition of the grafted quinone derivative from the surface of the carbon and hence indicates the level of grafting achieved for each sample (i.e., the larger the weight loss percentage, the better the grafting method). The thermogravimetric curves attest for the favorable role of excess nitrite present in the reaction mixture before carbon addition to increase 2-aminoanthraquinone grafting onto the carbon, achieving>14 wt % increase.

Examples 5A and 5B

Carbon Surface Modification Using 3,4,5-Trimethoxyanyline

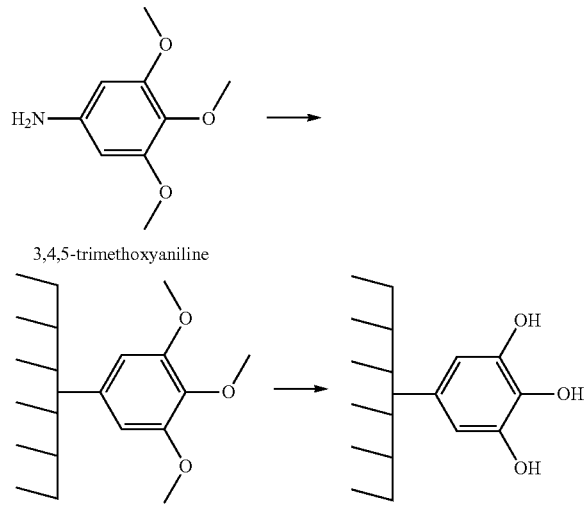

A: Dissolve 0.8 gr of 3,4,5-Trimethoxyaniline (4.4 mmol) in 300 ml ACN until complete dissolution of the amine derivative. Add 3 eq of tertbutyl nitrite 1.35 gr (1.05 ml 90% solution). After 5 minutes, add 1 eq of active carbon. Stir the mixture for 24 hours. Split the active carbon cloth to two portions and dry. Suspend 1 part of the modified active carbon with 150 ml DCM. Add 40 ml of 1M BBr$_3$ solution in DCM (3×3 eq) and stir for 48 hr at room temperature. Add 80 ml methanol portionwise, filter and wash with water three times and aliquot amount of acetonitrile, DMF, acetone and methanol. Dry the modified carbon at 100° C. for 4 hours.

B: Dissolve 3 gr of 3,4,5-Trimethoxyaniline (16 mmol) in 600 ml ACN until complete dissolution of the amine derivative. Add 3 eq of tertbutyl nitrite 5 gr (7.1 ml 90% solution). After 10 minutes, add 1.3 g of active carbon. Stir the mixture for 24 hours at room temperature, filter the reaction mixture and wash with aliquot amount of acetonitrile, DMF, acetone and methanol. Dry the modified carbon at 100° C. for 4 hours to yield 1.93 gr of modified carbon (48% enrichment). Split the active carbon cloth to two portions and dry. Suspend 1 part of the modified active carbon with 150 ml DCM. Add 40 ml of 1M BBr$_3$ solution in DCM (3×3 eq) and stir for 48 hr at room temperature. Add 80 ml methanol portionwise, filter and wash with water three times and aliquot amount of acetonitrile DMF acetone and methanol. Dry the modified carbon at 100° C. for 4 hours.

Example 6

Carbon Surface Modification Using 4-Aminobenzenethiol

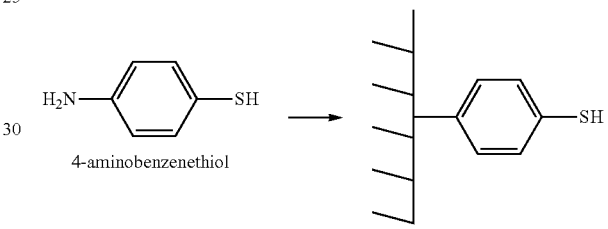

Dissolve 1 gr of 4-aminobenzenethiol (8 mmol) in 200 ml ACN until complete dissolution of the amine derivative. Add 3 eq of tertbutyl nitrite 2.46 gr (3.48 ml 90% solution). After 5 minutes add 2 eq of activated carbon cloth. Stir the mixture for 24 hours at room temperature, filter the reaction mixture and wash with aliquot amount of acetonitrile, DMF, acetone and methanol. Dry the modified carbon at 100° C. for 4 hours.

Example 7

Carbon Surface Modification Using 4,4'-Disulfanediyldianiline

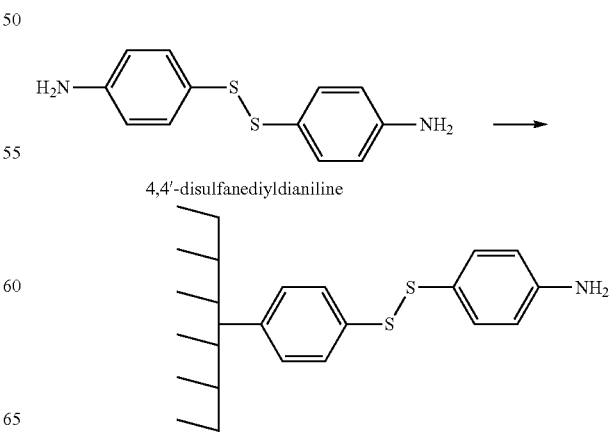

Dissolve 1 gr of 4,4'-disulfanediyldianiline (4 mmol) in 200 ml ACN until complete dissolution of the amine derivative. Add 3 eq of tertbutyl nitrite 1.23 gr (1.74 ml 90% solution). After 5 minutes add 2 eq of activated carbon. Stir the mixture for 24 hours at room temperature, filter the reaction mixture and wash with aliquot amount of acetonitrile, DMF, acetone and methanol. Dry the modified carbon at 100° C. for 4 hours.

Example 8

Carbon Surface Modification Using 5-Amino-2-Hydroxybenzoic Acid

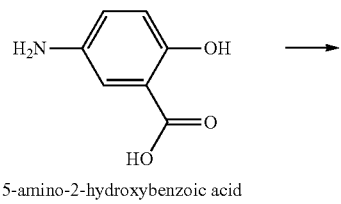

5-amino-2-hydroxybenzoic acid

Example 9

Carbon Surface Modification Using 5-Aminoisophthalic Acid

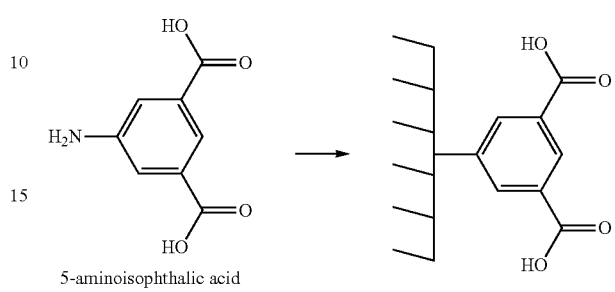

5-aminoisophthalic acid

Dissolve 1.6 gr of 5-aminoisophthalic acid (8.8 mmol) in 200 ml ACN until complete dissolution of the amine derivative. Add 3 eq of tertbutyl nitrite 2.73 gr (3.48 ml 90% solution). After 5 minutes, add 2 eq of active carbon cloth. Stir the mixture for 24 hours, filter the reaction mixture and wash with aliquot amount of acetonitrile, DMF, acetone and methanol. Dry the modified carbon at 100 for 4 hours.

Example 10

Carbon Surface Modification Using 2,7-Diaminophenanthrene-9,10-Dione

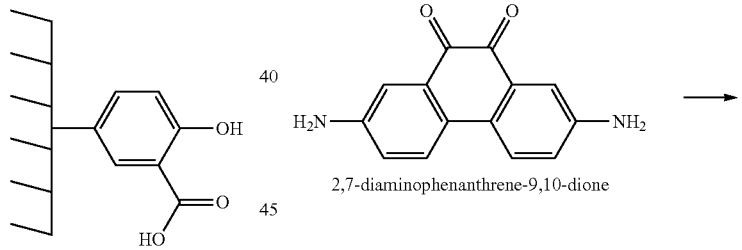

2,7-diaminophenanthrene-9,10-dione

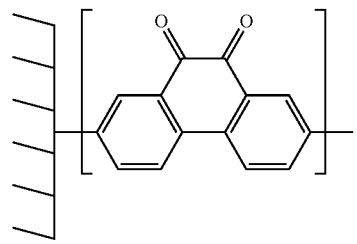

In 250 ml, round bottom flask dissolve 3 gr of Aminosalicylic acid (19.5 mmol) in 100 ml dry THF. Add slowly 2.34 gr 2.75 ml 1.1 eq of TMSiCl (21.45 mmol) and stir for 1 hour. Add 60 ml methanol and 2 eq of TMSiCl 4.95 ml 4.2 gr (39 mmol) and stir for 24 hours. Concentrate reaction mixture and dissolve in DCM/EtOAc/hexane. Wash with water and recrystallize the product from EtOAc/hexane.

Dissolve 3.1 gr of protected ASA amino salicylic acid (13 mmol) in 250 ml ACN until complete dissolution of ASA, add 3 eq of tertbutyl nitrite 4.5 gr (5.4 ml 90% solution) after 5 minutes add 1 eq of active carbon. Stir the mixture for 24 hr. Evaporate the reaction mixture and dissolve it in 50 ml of DCM and add 1 eq of BBr3 and stir in ice bath for 3 hours and in room temperature for 24 hr. Quench BBr3 with 3 eq of water/methanol. Add 1 eq of TBAF and stir for 24 hr. Wash with water and filter the reaction mixture, wash with aliquot amount of acetonitrile, DMF, acetone and methanol. Dry the ASA-modified at 100° C. for 4 hours.

Dissolve 3 gr of 2,7-diaminophenanthrene-9,10-dione (13.5 mmol) in 350 ml ACN until complete dissolution of the amine derivative. Add 3 eq of tertbutyl nitrite 4.2 gr (6 ml 90% solution). After 10 minutes add 1.8 g of active carbon cloth. Stir the reaction mixture for 24 hours, filter the reaction mixture and wash with aliquot amount of acetonitrile, DMF, acetone and methanol. Dry the modified carbon at 100° C. for 4 hours to yield 2.6 gr of modified carbon (40% enrichment).

Example 11

Carbon Surface Modification Using 5-Amino-2,3-Dihydrophthalazine-1,4-Dione

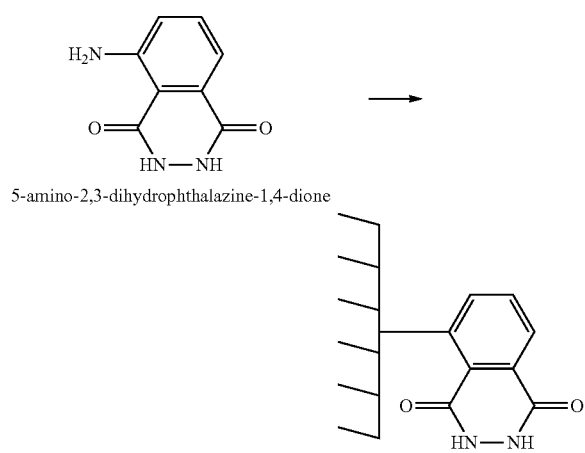

Dissolve 1.2 gr of 5-amino-2,3-dihydrophthalazine-1,4-dione (6.9 mmol) in 200 ml ACN until complete dissolution of the amine derivative. Add 3 eq of tertbutyl nitrite 2.07 gr (3 ml 90% solution). After 5 minutes add 1 eq activated carbon cloth. Stir the reaction mixture for 24 hours, filter the reaction mixture and wash with aliquot amount of acetonitrile, DMF, acetone and methanol. Dry the modified carbon at 100° C. for 4 hours.

Example 12

Carbon Surface Modification Using 4-Aminobenzenesulfonic Acid

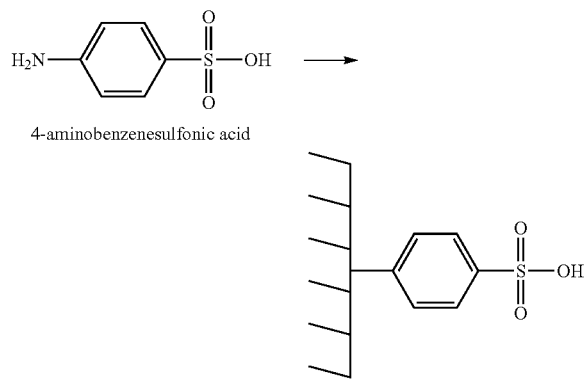

Dissolve 1 gr of 4-aminobenzenesulfonic acid (6.3 mmol) in 200 ml ACN until complete dissolution of the amine derivative. Add 3 eq of tertbutyl nitrite 1.95 gr (2.76 ml 90% solution). After 5 minutes add 2 eq of activated carbon cloth and stir for 24 hours. Filter the reaction mixture and wash with aliquot amount of acetonitrile, DMF, acetone and methanol. Dry the modified carbon at 100° C. for 4 hours.

Example 13

Carbon Surface Modification Using 2-Amino-1,9-Dihydro-6H-Purin-6-One

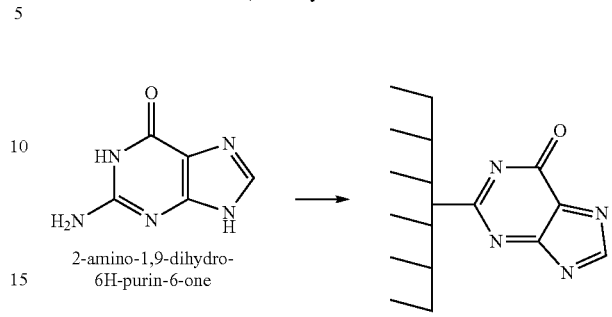

Dissolve 1 gr of 2-amino-1,9-dihydro-6H-purin-6-one (8 mmol) in 150 ml 1M HCl until complete dissolution of the amine derivative. Add 2 eq of sodium nitrite (0.9 gr) and Fe powder (0.1 gr) followed by 2 eq of activated carbon cloth. Stir the mixture for 4 hours at room temperature, filter the reaction mixture and wash with aliquot amount of acetonitrile, DMF, acetone and methanol. Dry the modified carbon at 100° C. for 4 hours.

Example 14

Carbon Surface Modification Using 7H-Purin-6-Amine on Carbon

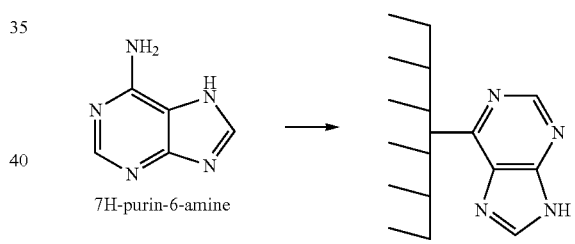

Dissolve 1 gr of 7H-purin-6-amine (8 mmol) in 150 ml 1M HCl until complete dissolution of the amine derivative. Add 2 eq of sodium nitrite (0.9 gr) and Fe powder (0.1 gr) followed by 2 eq of activated carbon. Stir the mixture for 4 hours at room temperature, filter the reaction mixture and wash with aliquot amount of acetonitrile, DMF, acetone and methanol. Dry the modified carbon at 100° C. for 4 hours.

Example 15

Testing Electrodes Made of the Surface-Modified Carbon

Cyclic voltammetry (CV) was used to assess the performance of the electrodes. CV was carried out in three-electrode set-up. The working electrode was a disc shaped from the modified carbon (4 mm in diameter) with an average weight of 2 mg (≈15 mg/cm$^2$). Counter electrode (11 mm in diameter) was made from an unmodified carbon with an average weight of 11 mg. A saturated calomel electrode (SCE) was used as reference electrode. Electrodes were immersed in distilled water under vacuum, followed by electrolyte solution. Three electrode T cells were assembled by introducing the soaked electrodes on glassy carbon current collector, separated with a separator. $H_2SO_4$ (1M, 2M and 4M), HCl (1M, 2M and 4M) and KOH (1M, 2 m and 6M) were used as electrolyte solution. Scan rate was in the range from 2 mV/s to 20 mV/s.

Figure 2:
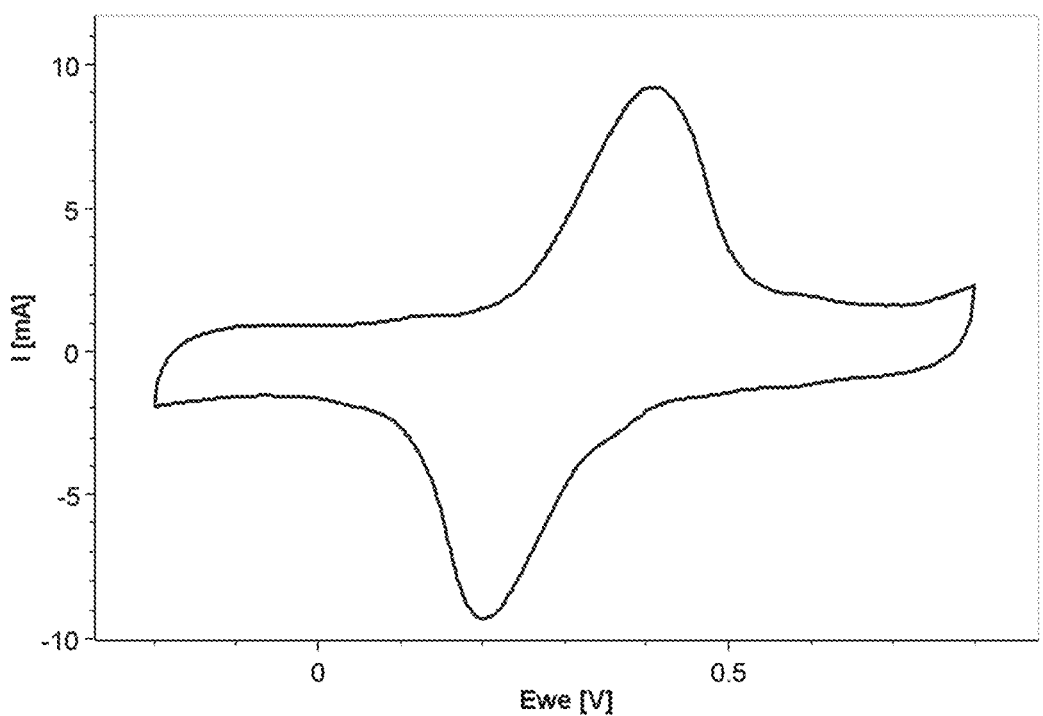
FIG. 2: Voltammogram (CV) of an electrode made of carbon material grafted with 3, 4, 5-Trimethoxyaniline.
Figure 3:
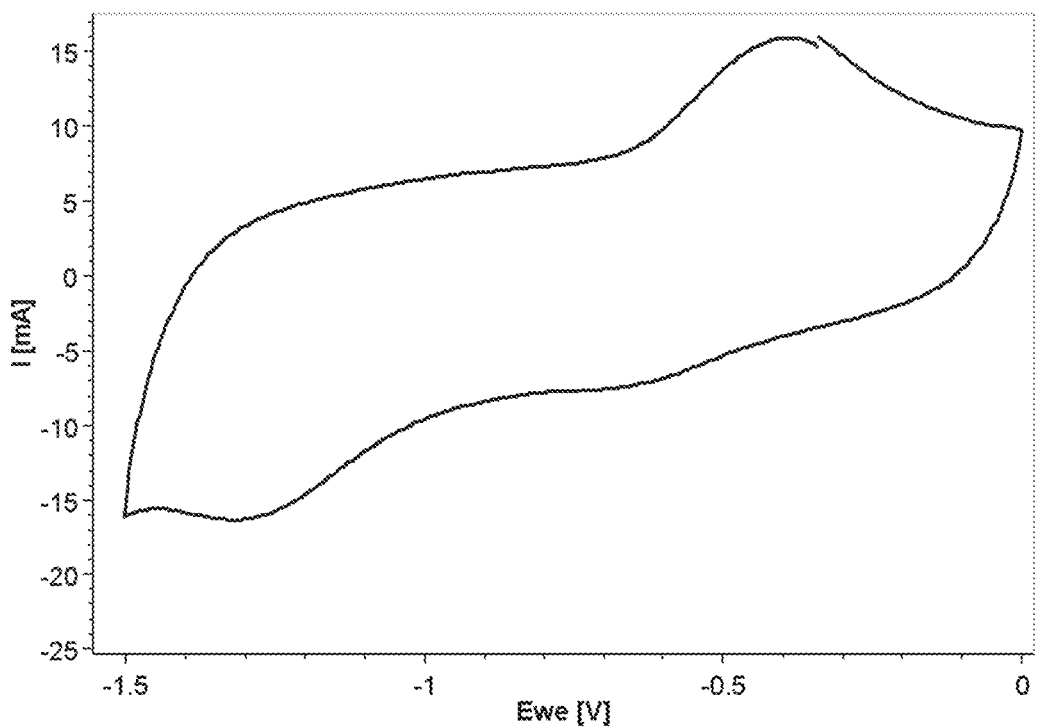
FIG. 3: Voltammogram (CV) of an electrode made of carbon material grafted with 4-aminobenzenethiol.
Figure 4:
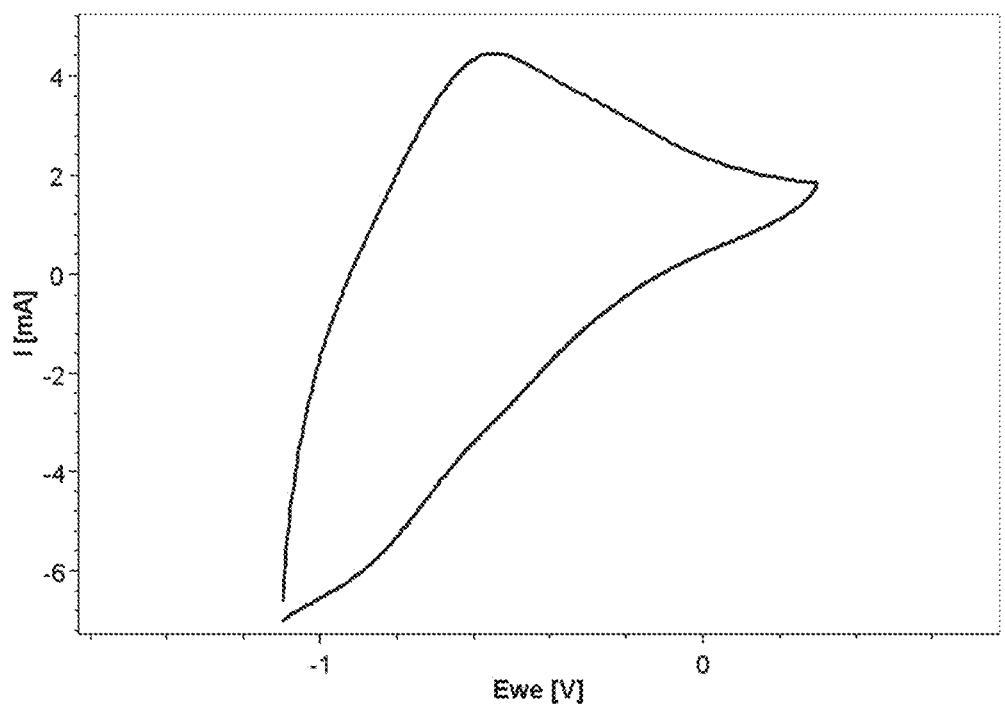
FIG. 4: Voltammogram (CV) of an electrode made of carbon material grafted with 4, 4'-disulfanediyldianiline.
Figure 5:
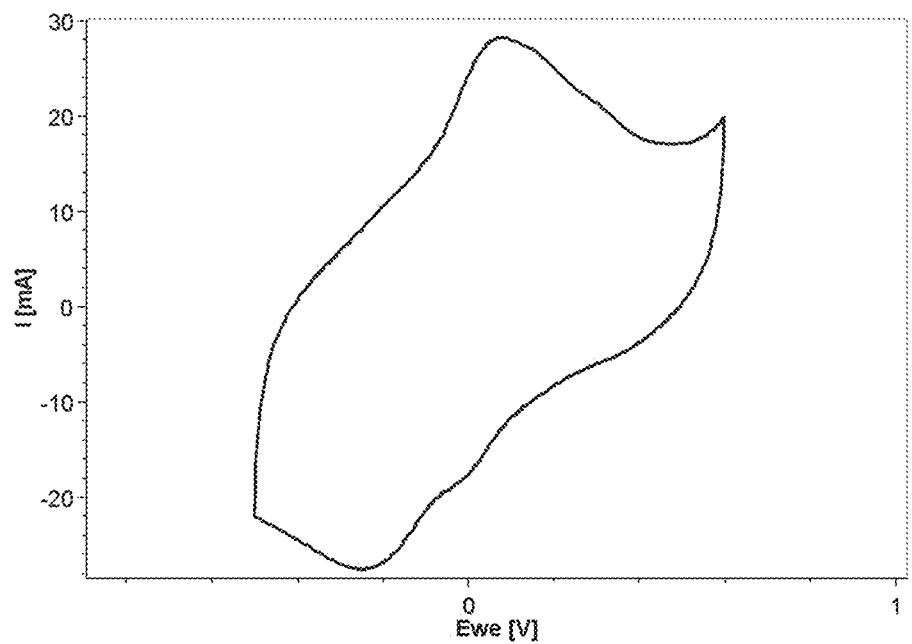
FIG. 5: Voltammogram (CV) of an electrode made of carbon material grafted with 5-amino-2-hydroxybenzoic acid.
Figure 6:
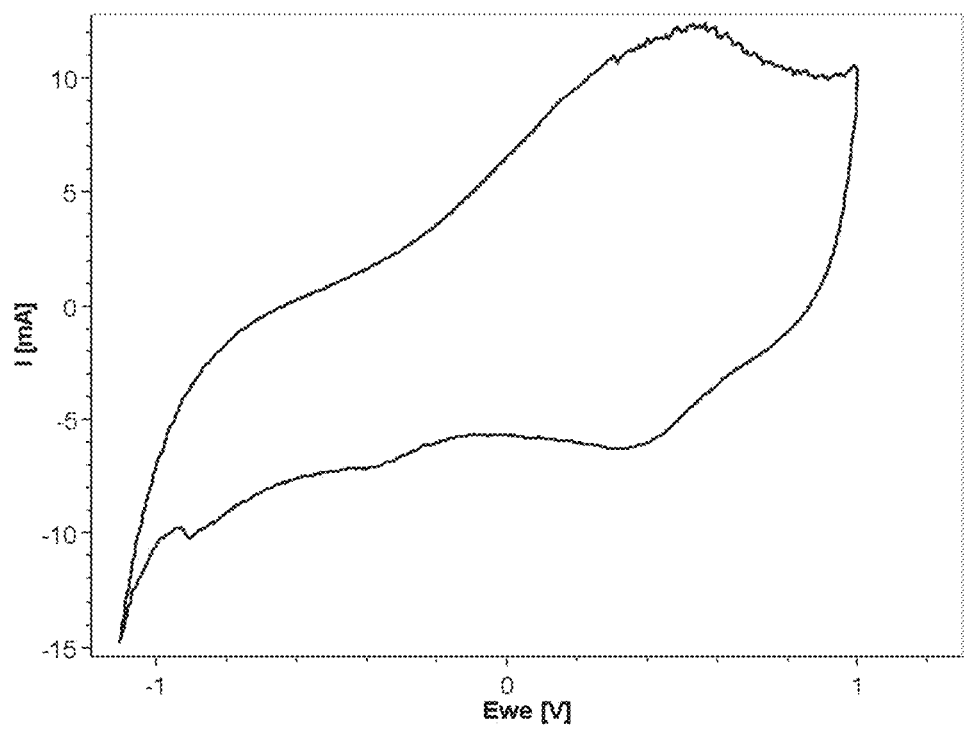
FIG. 6: Voltammogram (CV) of an electrode made of carbon material grafted with HCl 5-aminoisophthalic acid.
Figure 7:
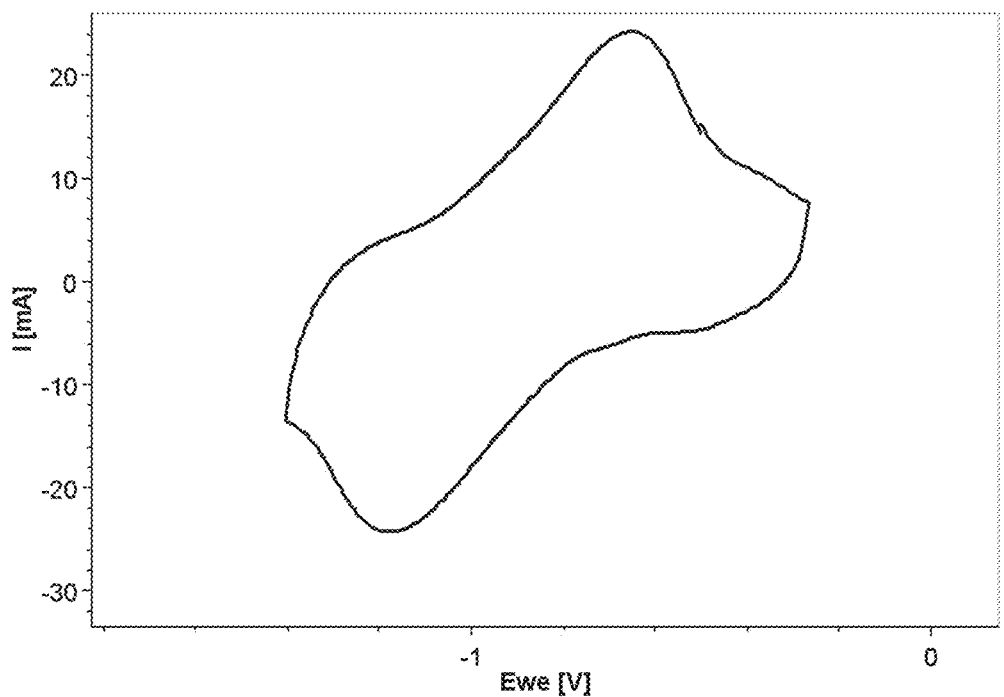
FIG. 7: Voltammogram (CV) of an electrode made of carbon material grafted with 6M KOH 2, 7-diaminophenanthrene-9, 10-dione.
Figure 8:
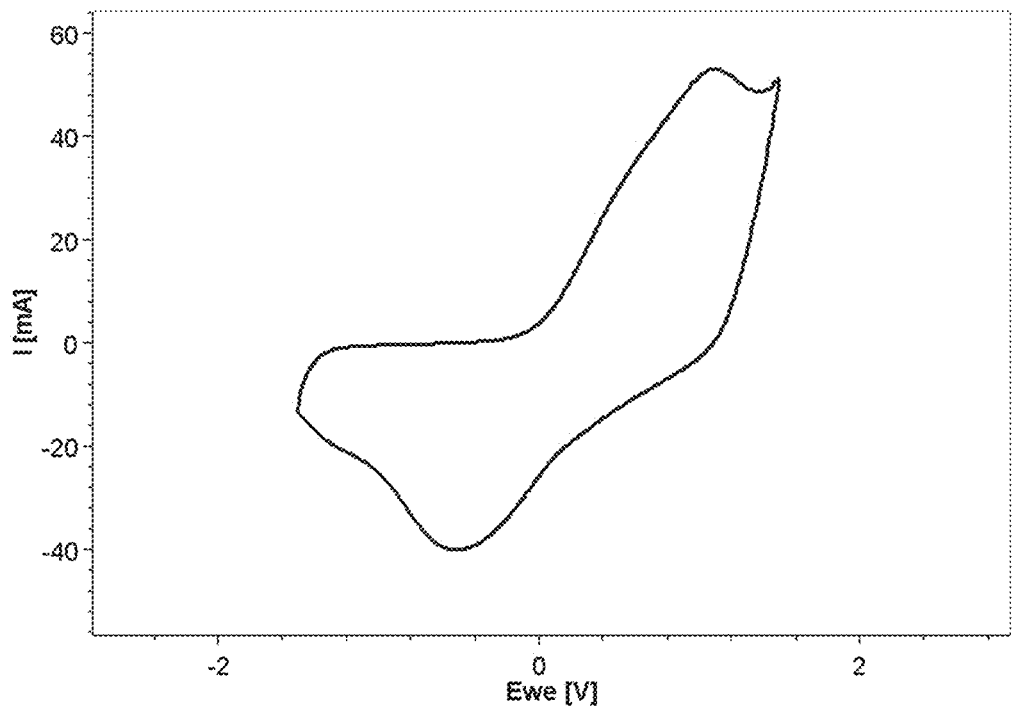
FIG. 8: Voltammogram (CV) of an electrode made of carbon material grafted with HCl 5-amino-2, 3-dihydrophthalazine-1, 4-dione.
Figure 9:
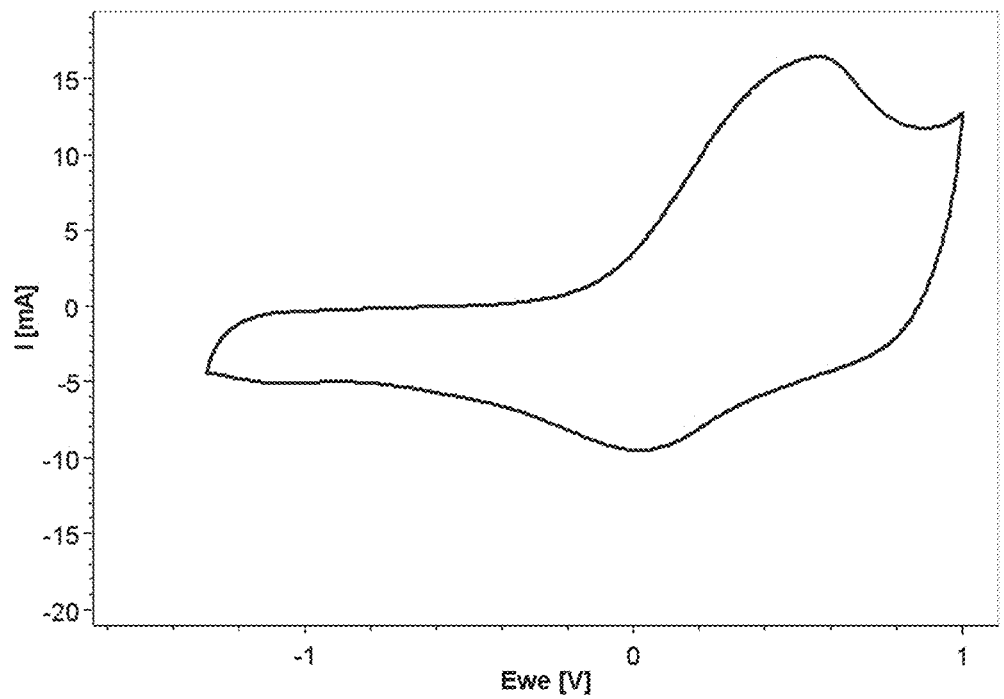
FIG. 9: Voltammogram (CV) of an electrode made of carbon material grafted with 4-aminobenzenesulfonic acid.
Figure 10:
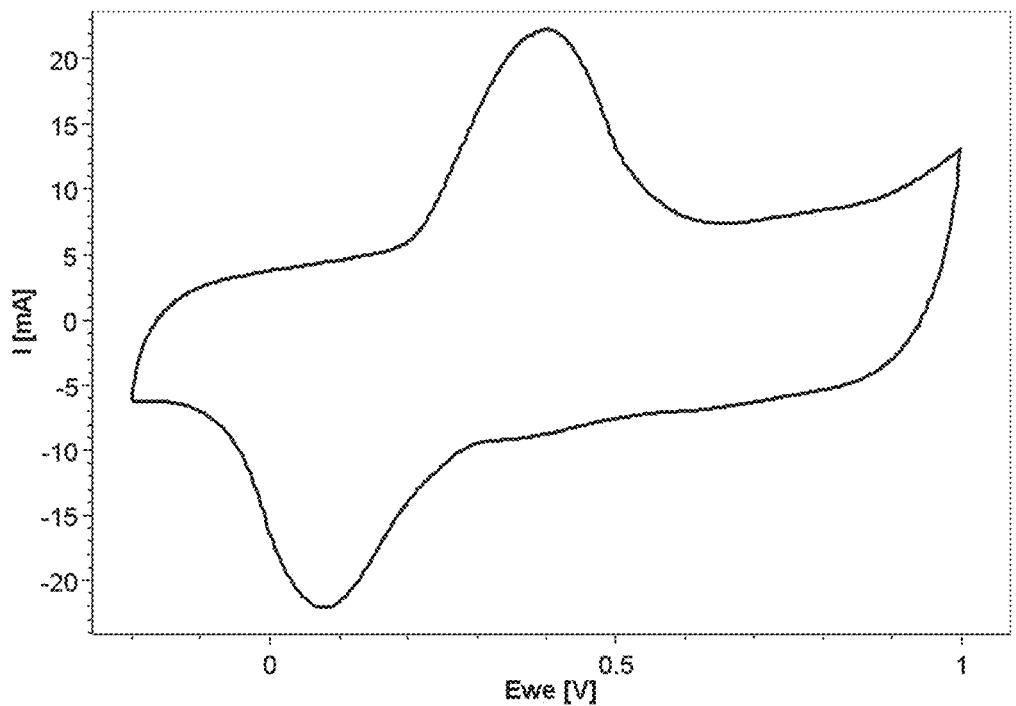
FIG. 10: Voltammogram (CV) of an electrode made of carbon material grafted with HCl 2-amino-1, 9-dihydro-6H-purin-6-one.
Figure 11:
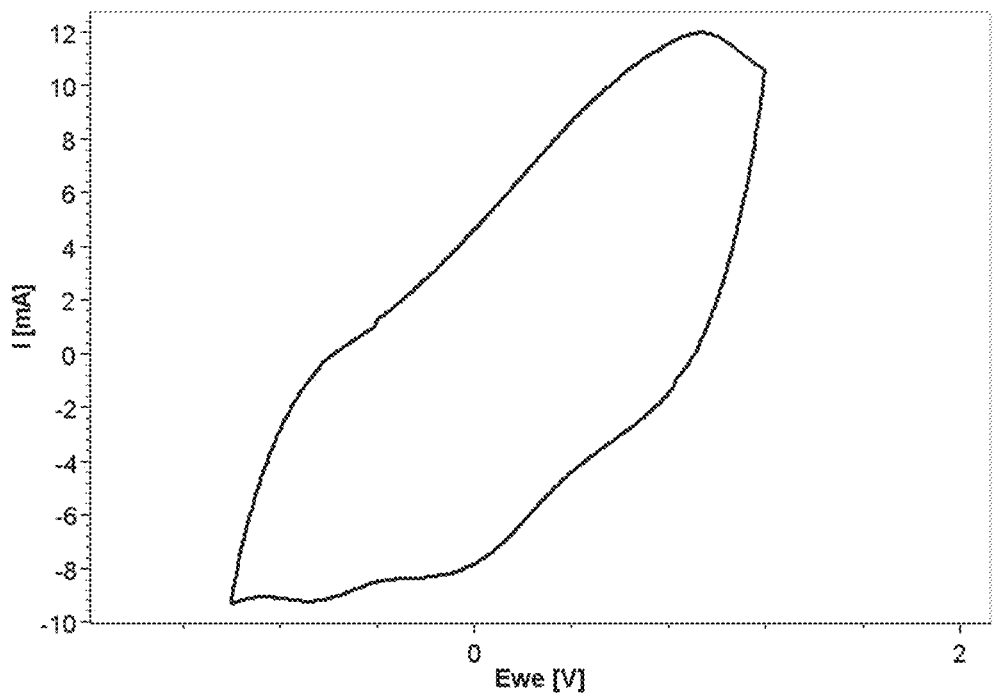
FIG. 11: Voltammogram (CV) of an electrode made of carbon material grafted with 7H-purin-6-amine.

Voltammograms shown in FIGS. 2 to 11, which correspond to Examples 5 to 14, respectively, indicate that each grafted molecule changes the normal nature of the native carbon host from EDL capacitor behavior to faradaic contribution of the redox molecule on the surface (FIG. 2 2M H2SO4 3,4,5-Trimethoxyaniline, FIG. 3 4M KOH 4-aminobenzenethiol, FIG. 4 4M KOH 4,4'-disulfanediyldianiline, FIG. 5 6M H2SO4 5-amino-2-hydroxybenzoic acid, FIG. 6 4M HCl 5-aminoisophthalic acid, FIG. 7 6M KOH 2,7-diaminophenanthrene-9,10-dione, FIG. 8 2M HCl 5-amino-2,3-dihydrophthalazine-1,4-dione, FIG. 9 2M H2SO4 4-aminobenzenesulfonic acid, FIG. 10 1M HCl 2-amino-1,9-dihydro-6H-purin-6-one, FIG. 11 1M HCl-7H-purin-6-amine.

Example 16

Addition of 3,4,5-Trihydroxybenzene to Carbon Cloth Using 3,4,5-Trimethoxyanyline and Characterization of the so-Formed Electrode The study reported in this Example consists of two parts. In the first part, 3,4,5-trimethoxyaniline (TMA) is added to carbon cloth via diazonium-based chemistry. The procedure results in the grafting of 3,4,5-trimethoxybenzene (TMB) to the carbon. The TMB-surface modified carbon cloth was then analyzed to determine the surface composition by X-ray photoelectron spectroscopy (XPS), the specific surface area by the Brunauer-Emmett-Teller (BET) method and sample weight loss as temperature rises by thermogravimetric analysis (TGA).

Next, in the second part, 3,4,5-trimethoxybenzene—which is an electrochemically inactive—is deprotected to remove the methoxy groups and give the corresponding electroactive 3,4,5-trimethoxybenzene (THB). The THB-surface modified carbon cloth was then tested as an electrode material.

Part A: Grafting and Characterization by XPS, BET and TGA

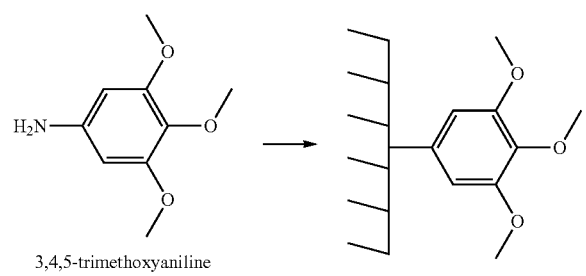 [SMILES: COc1cc(N)cc(OC)c1OC ; CCC(C)C(C)C(c1cc(OC)c(OC)c(OC)c1)C(C)C(C)CC]

3,4,5-trimethoxyaniline 100 mg of 3,4,5-trimethoxyaniline (TMA, 0.546 mmol) were dissolved in 100 ml of acetonitrile until complete dissolution of the amine derivative. Three equivalents of tert-butyl nitrite was added (0.240 ml of a 90% solution), followed by a 100 mg piece of Kynol™ carbon cloth. The mixture was stirred for 30 min. The modified piece of cloth was filtered and washed with aliquots of dimethylformamide, acetonitrile, acetone, and methanol and dried at 60° C. under vacuum, yielding 125 mg of modified carbon (25 wt % addition of grafted molecule, which is 3,4,5-trimethoxybenzene).

The surface elemental and chemical state analysis was performed by X-ray photoelectron spectroscopy (XPS). The XPS study was carried with Thermo Scientific Nexsa spectrometer, with monochromated Al Kα source. Survey spectra were carried our at PE of 200 ev and high resolution spectra at 50 eV. In-situ charge neutralization was used, and each set of measurement was recalibrated versus C is at 284.8 eV. Due to the conducting nature of the samples only slight charging was observed, in the ballpark of few 10's of meV. Quantification was done after "smart" baseline correction, using NEXSA's RSFs. Peak fiittings were carried out with gaussian-lorentian 70:30 peaks and reasoneable FWHM values.

Spectra are presented in FIGS. 12 a-f, and are arranged as follows: FIGS. 12a and 12d are the C is spectra of non-modified and surface-modified carbon cloth, respectively; FIGS. 12b and 12e are the O 1s spectra of non-modified and surface-modified carbon cloth, respectively; and FIGS. 12c and 12f are the N 1s spectra of non-modified and surface-modified carbon cloth, respectively.

Figure 12C:
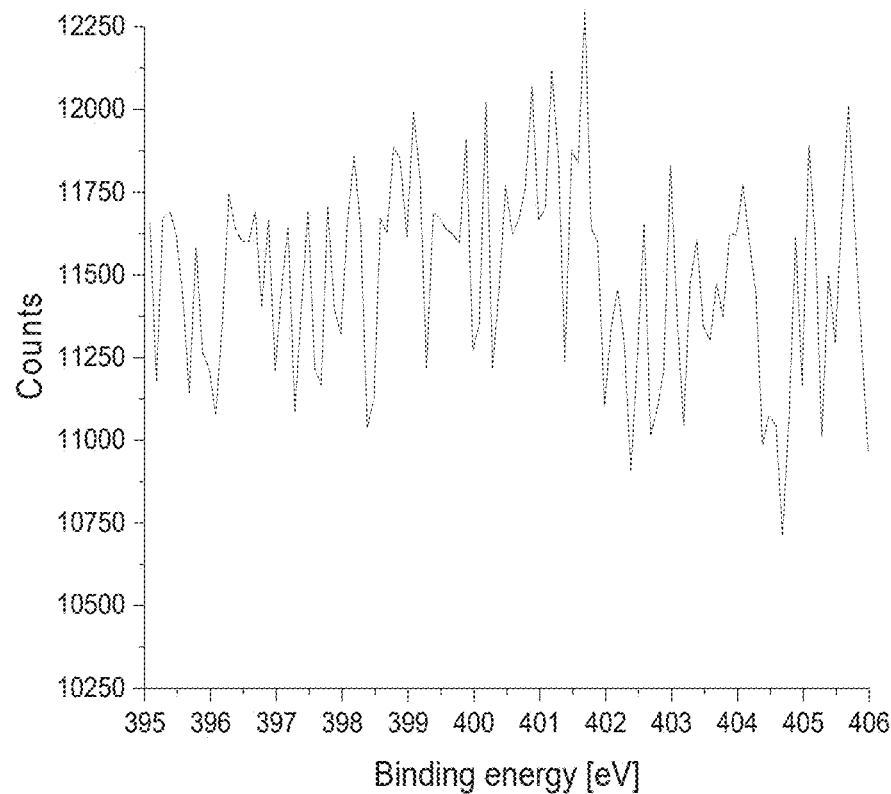
Figure 12D:
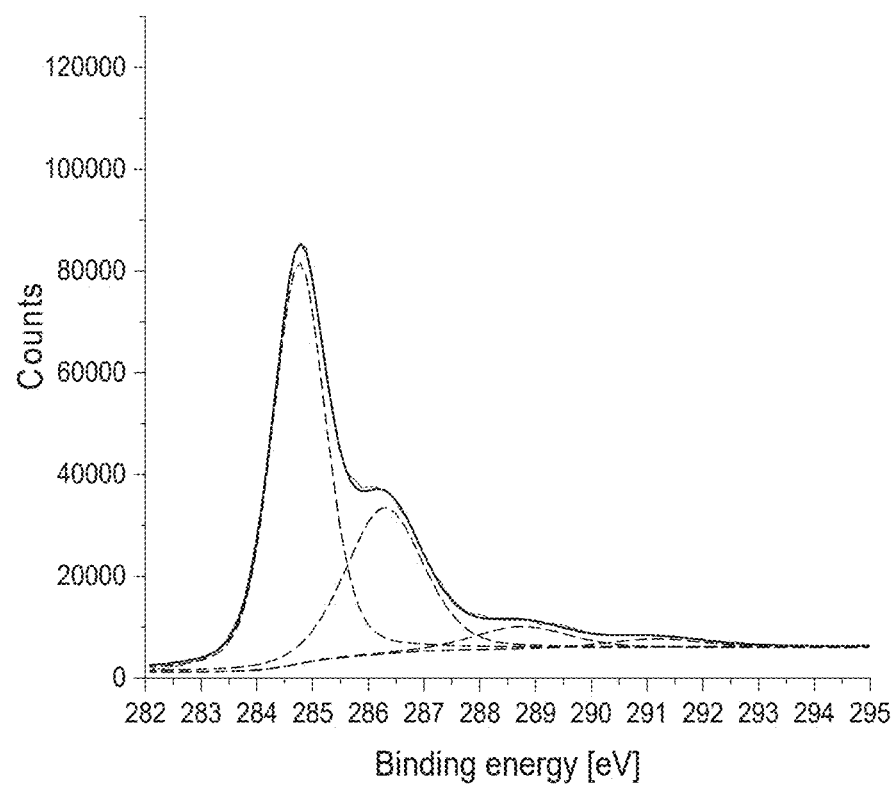

The XPS spectra confirm the addition of 3,4,5-trimethoxyaniline to the carbon cloth through the diazonium chemistry:

The C is spectra of the modified carbon seen in FIG. 12d exhibits a well resolved and strong peak at a binding energy of 286.5 eV, assigned to the additional methoxy groups (oxidized carbon), which are part of the grafted molecule added to the carbon. This peak is not seen in FIG. 12a, of the non-modified cloth.

Comparing the O 1s spectra of modified (FIG. 12e) and unmodified carbon cloth (FIG. 12b), it is seen that the grafted carbon cloth in the O 1s spectra shows considerably stronger peak than the unmodified. This is due to the addition of three oxygen atoms per grafted molecule. The intensification of the higher binding energy peak, at 533.5 eV reflects enrichment in higher electron density oxygen sites. Meaning the oxygen is in higher oxidation state in the grafted electrodes. This result indicates that the oxygen originates from the carbons surface has lower levels of binding energy compare to the oxygen at the methoxy/hydroxy from the grafted molecule.

As expected, nitrogen atoms are barely detected in the unmodified carbon cloth (FIG. 12c). In contrast, the TMA-grafted carbon cloth (FIG. 12f) exhibits a strong peak of nitrogen at around 400 eV. A smaller, but still discernible peak, appears at slightly lower binding energy, at ca. 402.2 eV. These peaks are presumably due to alternate grafting pathways/side reactions associated with diazonium chemistry, leaving N-containing moieties on the carbon surface, e.g., where the diazonium salt is directly coupled to the carbon substrate, instead of the "normal" diazonium chemistry which leads to spontaneous degradation to $N_2$ and aryl radical, with $N_2$ departure. Nevertheless, the detection of nitrogen on the carbon surface indirectly attests to the grafting process.

BET measurements were carried out in a Quantachrome NOVA 3200e surface area and pore size analyzer with nitrogen as an adsorbent. The surface area of the commercial activated carbon (Kynol™ carbon cloth) is ~1500 m²/g. The results tabulated in Table 1 indicate a significant drop in surface area, attesting to an extensive grafting of 3,4,5-trimethoxybenzene (TMB).

TABLE 1

| Carbon cloth | Surface area [m²/g] | Surface area [%] |
|---|---|---|
| Plain | 1495 | 100 |
| TMB modified | 139 | 9 |

Figure 13:
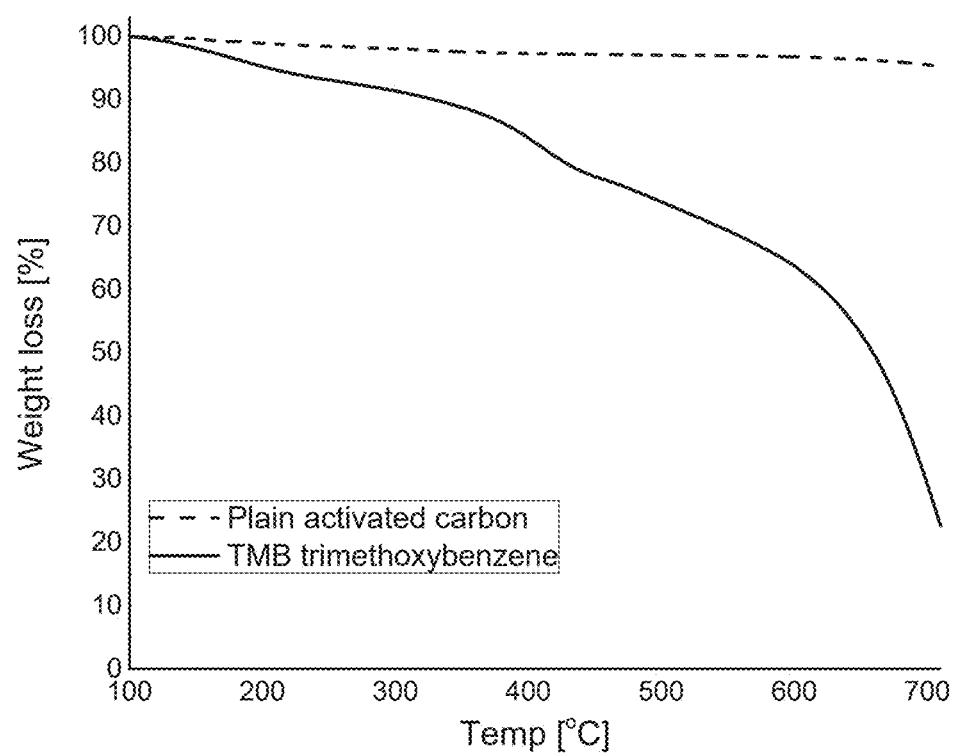
FIG. 13: TGA thermogram of unmodified and TMB-modified carbon cloth.

TGA was performed under nitrogen at a temperature increase rate of 10K/min using the instrument mentioned above, for unmodified (commercial carbon cloth material) and the surface-modified carbon cloth material. The thermogram appended as FIG. 13 indicates a weight loss of about 25% up to temperature of 450° C. for the TMA-surface modified carbon cloth sample. That is, TGA indicates 25% mass loading of THB over activated carbon.

Part B: Electrochemical Deprotection and Characterization unmodified carbon cloth with an average weight of 46 mg (double disks of 12 mm), resulting in an electrode mass loading of about 40 mg/cm². NKK cellulose paper was used as a separator. Electrodes were immersed in distilled water and slightly swirled under vacuum to allow good wetting, followed by soaking in $H_2SO_4$ (2M) solution to allow the osmotic pressure to bring in the solution to the pores within the entire electrode mass. A saturated calomel electrode (SCE) was used as the reference electrode.

Without wishing to be bound by theory, the electrochemical irreversible cleavage of the methoxy group (at 0.7 V vs. SCE in 2M sulfuric acid electrolyte solution), transforming the inactive grafted TMA molecule into the electroactive THA, is illustrated by the scheme depicted below:

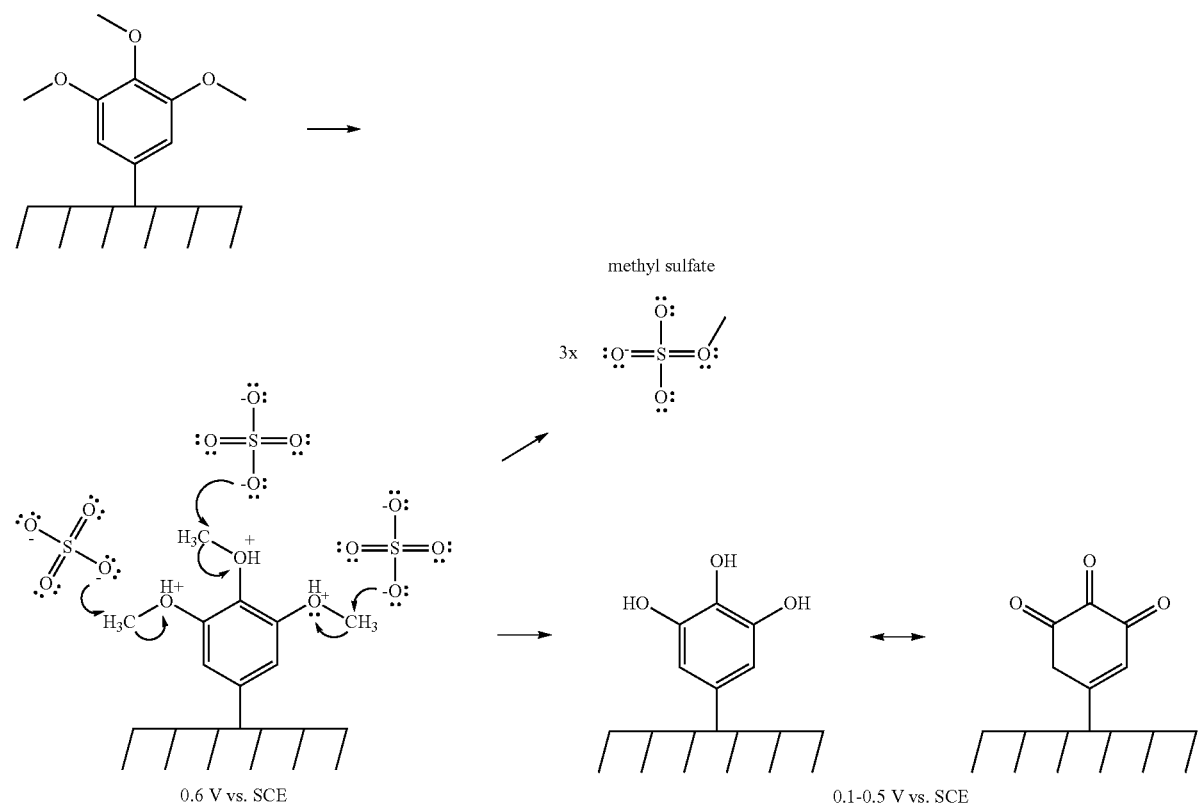

The grafted molecule TMB underwent electrochemical deprotection to give the electroactive THA molecule. The deprotection reaction took place in a three-electrode T cell, with sulfuric acid as electrolyte solution, where the TMA-surface modified carbon cloth served as the working electrode and was followed by electrochemical measurements to evaluate the performance of the THA-grafted electrode.

Figure 14A:
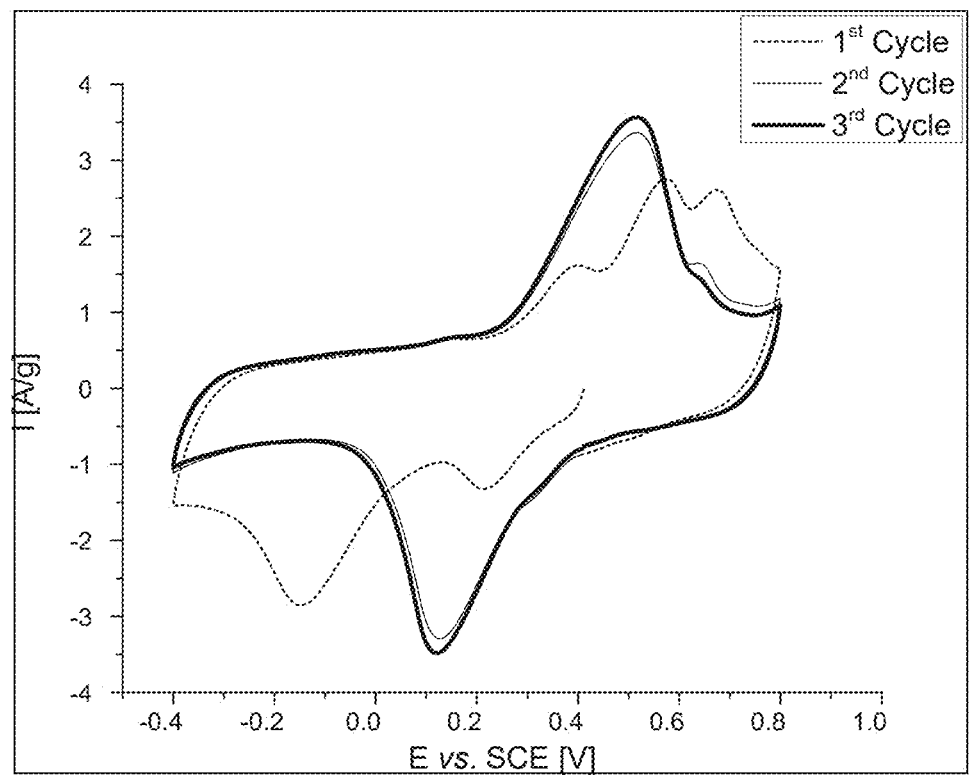
FIGS. 14A-14B: Cyclic voltammetry of carbon cloth grafted with TMA and THB at different rates, respectively (with FIG. 14B being after methoxy cleavage from TMA).
Figure 14B:
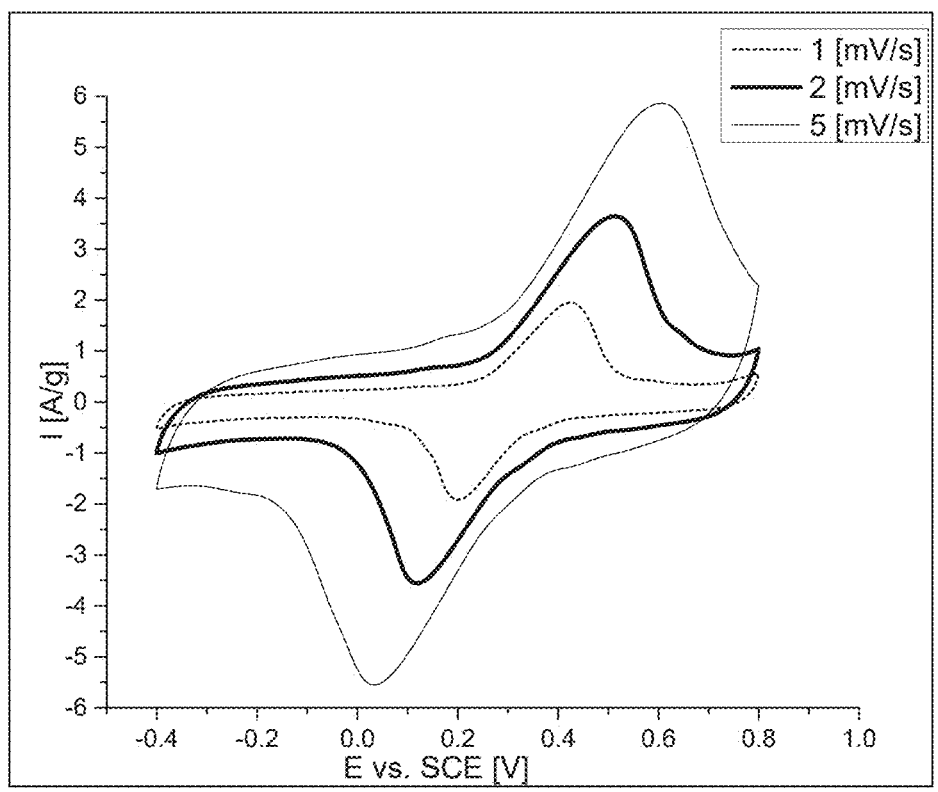

Swagelok three electrode T cell was used for the electrochemical deprotection reaction and subsequent measurements. Electrodes were made of PTFE cylinder assembled with 2, 4 mm glassy carbon rods, serving as both current collectors and terminals. Working electrodes were punched from the modified carbon cloth 6 mm in diameter with an average weight of 7 mg (≈25 mg/cm²) which resembles real life electrodes as found in commercial devices, and counter electrodes of 2×12 mm in diameter were punched from an Polarization is shown to be activation at potentials up to a 0.6 V vs. SCE. Early protonation of the oxygen directs an E1 reaction of the poor sulfate ion nucleophile on the positively charged methyl. This process is demonstrated well in the cyclic voltammetry of THB grafted on Kynol® carbon cloth in FIG. 14A. The first cyclic voltammetry cycles for the TMA-grafted carbon cloth indicate cleavage of the methoxy groups to form trihydroxybenzene up to the third cycle at a scan rate of 2 mV/s. Voltammograms recorded at different scan rates in the 2M $H_2SO_4$ electrolyte solution are seen in FIG. 14B. The peak currents related to the methoxy cleavage take place at 0.6-0.7 V and compound is transformed to the THB redox active at 0.1-0.5 V.

Figure 15A:
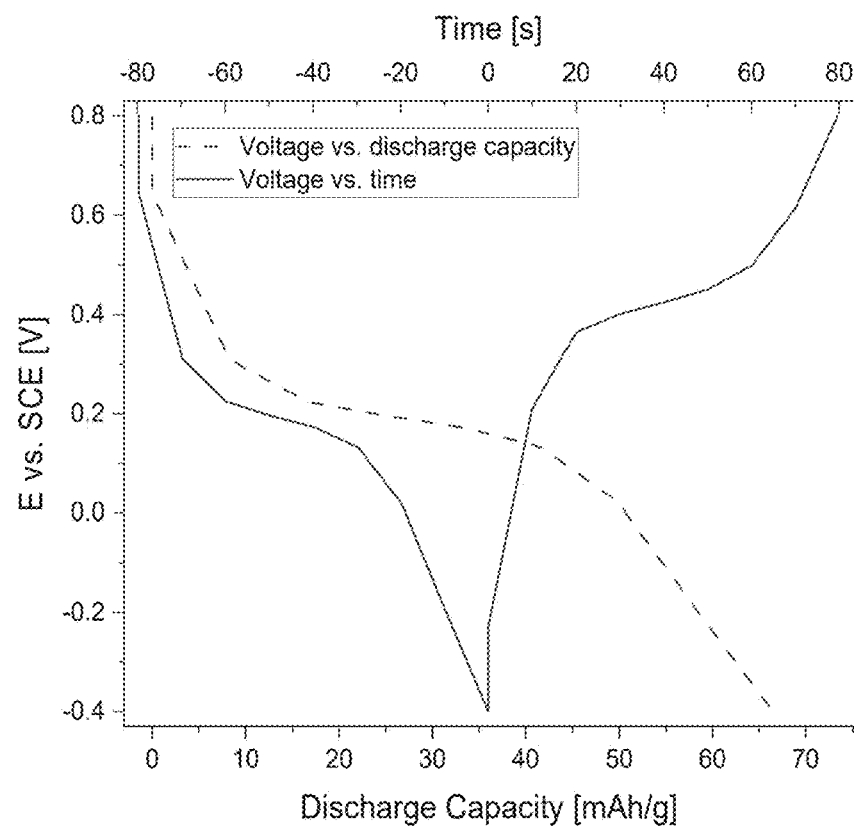
FIGS. 15A-15B: Galvanostatic measurements of a THB-modified electrode.
Figure 15B:
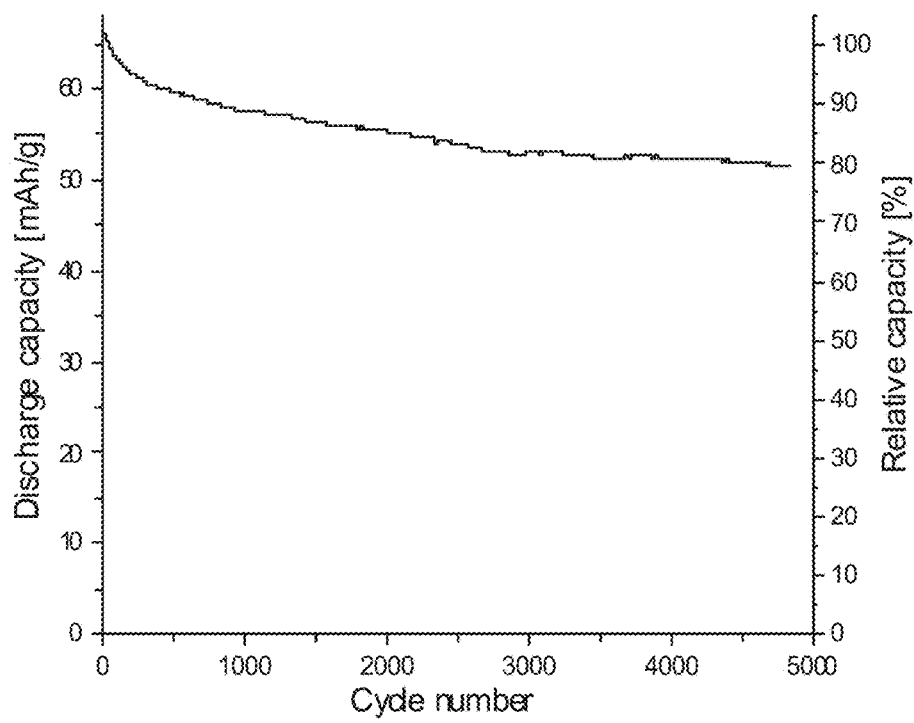

The THB-modified electrode was then studied by galvanostatic measurement in the three-electrode set up with 2M $H_2SO_4$ electrolyte solution. The charge/discharge voltage profile obtained by cycling across a voltage window of −0.4V to 0.8V with a current density of 3 A/g is shown in FIG. 15A. Discharge capacity of 65 mAh/g was measured over 2000 cycles; it then dropped to 55 mAh/g and maintained at this value for additional 2500 cycles. Thus, overall, galvanostatic measurements and prolonged cycling, over 4500 cycles, of THB grafted on Kynol™ cloth, indicate the good performance of the electrode material in acidic electrolyte. The plateau at around 0.1-0.5 V vs. SCE, indicates a faradaic redox reaction.

The major results of the galvanostatic measurements are tabulated in Table 2, alongside those reported for anthraquinone(AQ)-grafted Kynol™ cloth in Electrochemical Society 165 (14) A3342-A3349 (2018) and for dihydroxybenzne (DHB)-grafted Kynol™ cloth in Electrochemical Society 166 (6) A1147-A1153 (2019). The results indicate that AQ-grafted carbon cloth, DHB-grafted carbon cloth and THB-grafted carbon cloth exhibit comparable capacitance increase.

TABLE 2

| Grafted molecule | Electrolyte solution | Mass loading [%] | Potential [V] vs. SCE | Capacity [mAh/g] | Current density [A/g] |
|---|---|---|---|---|---|
| Plain | 1M $H_2SO_4$ | 0 | 0.4--0.6 | 20 | 10 |
| AQ | 1M $H_2SO_4$ | 25 | 0.4--0.6 | 65 | 10 |
| DHB | 1M $H_2SO_4$ | 41 | 0.8--0.2 | 75 | 1 |
| THB | 2M $H_2SO_4$ | 25 | 0.8--0.4 | 65 | 3 |

Example 17

Addition of 2,7-Diamino-9,10-Phenanthrenequinone to Carbon Cloth and Characterization of the so-Formed Electrode The study reported in this Example consists of two parts. In the first part, 2,7-diamino-9,10-phenanthrenequinone (PQ) was added to carbon cloth via diazonium-based chemistry. The PQ-surface modified carbon cloth was then analyzed to determine sample weight loss as temperature rises by thermogravimetric analysis (TGA).

Next, in the second part, The PQ-surface modified carbon cloth was tested as an electrode material.

Part A: Grafting and Characterization by TGA

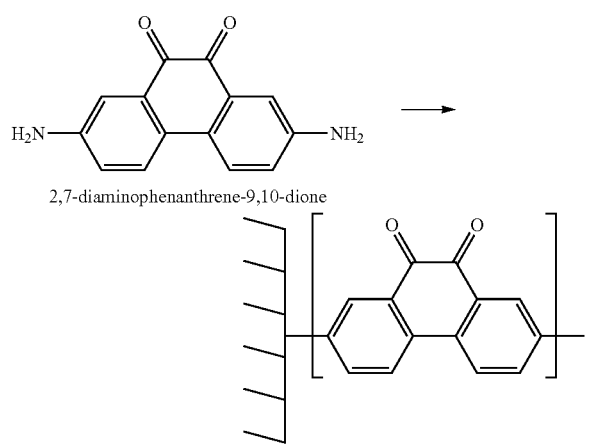

Figure 16:
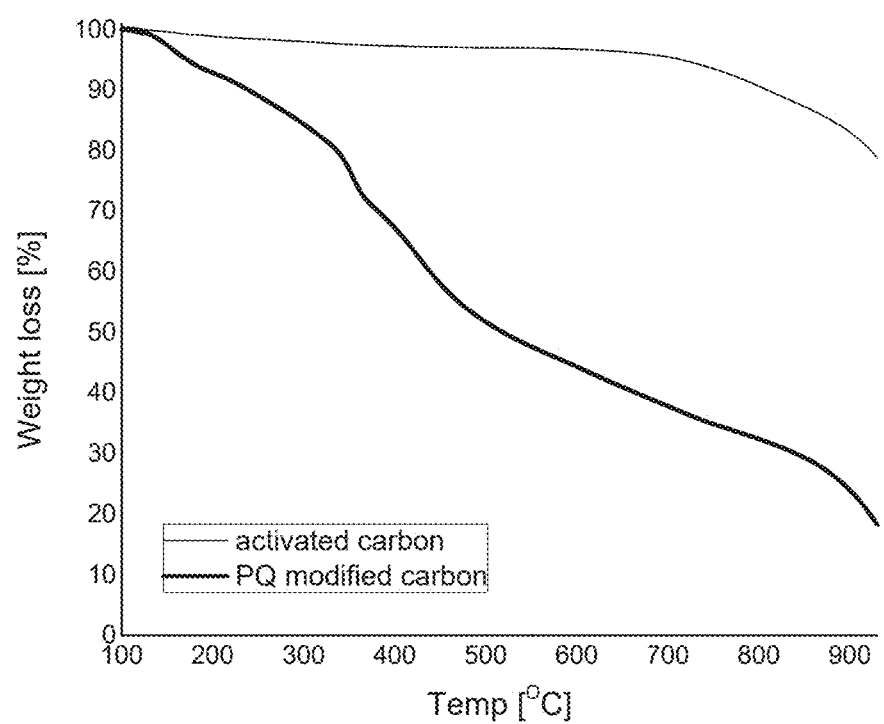
FIG. 16: TGA thermogram of unmodified and PQ-modified carbon cloth.

The procedure described in Example 10 was repeated. A sample (3-5 mg) was subjected to TGA under the conditions mentioned above. The thermogram is appended in FIG. 16. A reference sample consisting of the commercial Kynol™ cloth was also tested. The results indicate a weight loss of ~40-50% in the surface-modified carbon up to ~500° C., owing to the weight gained as a result of the molecules added to the carbon.

Part B: Electrochemical Characterization

The PQ-grafted carbon cloth was tested in two/three-electrode cell described in the previous Example in neutral electrolyte solutions (sodium bromide and barium chloride), by cyclic voltammetry and galvanostatic measurements.

Figure 17A:
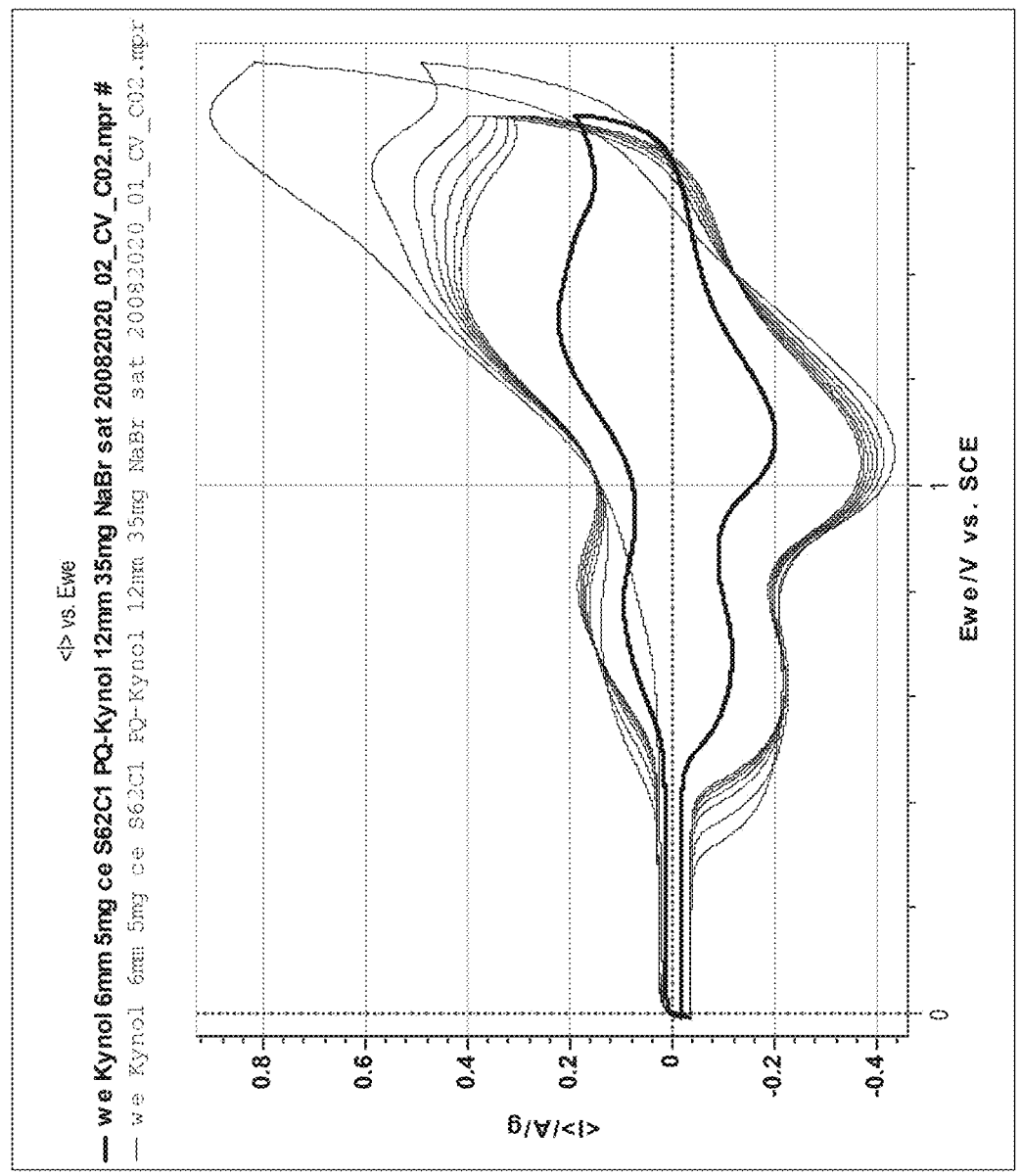
FIGS. 17A-17C: Voltametric (FIG. 17A) and galvanostatic (FIGS. 17B-17C) analyses of a PQ-grafted carbon electrode in a two electrodes configuration cell with saturated sodium bromide electrolyte solution.
Figure 17B:
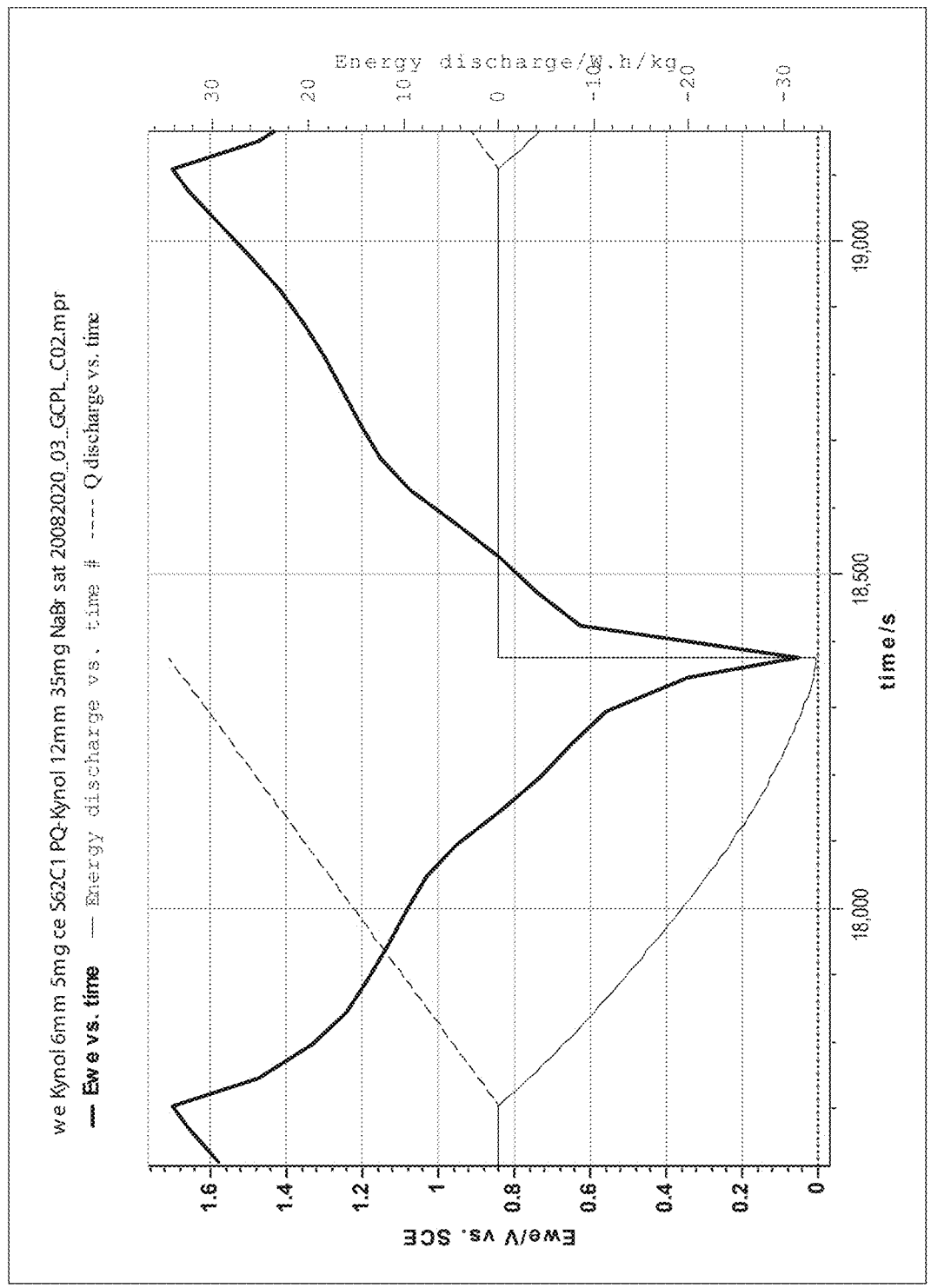
Figure 17C:
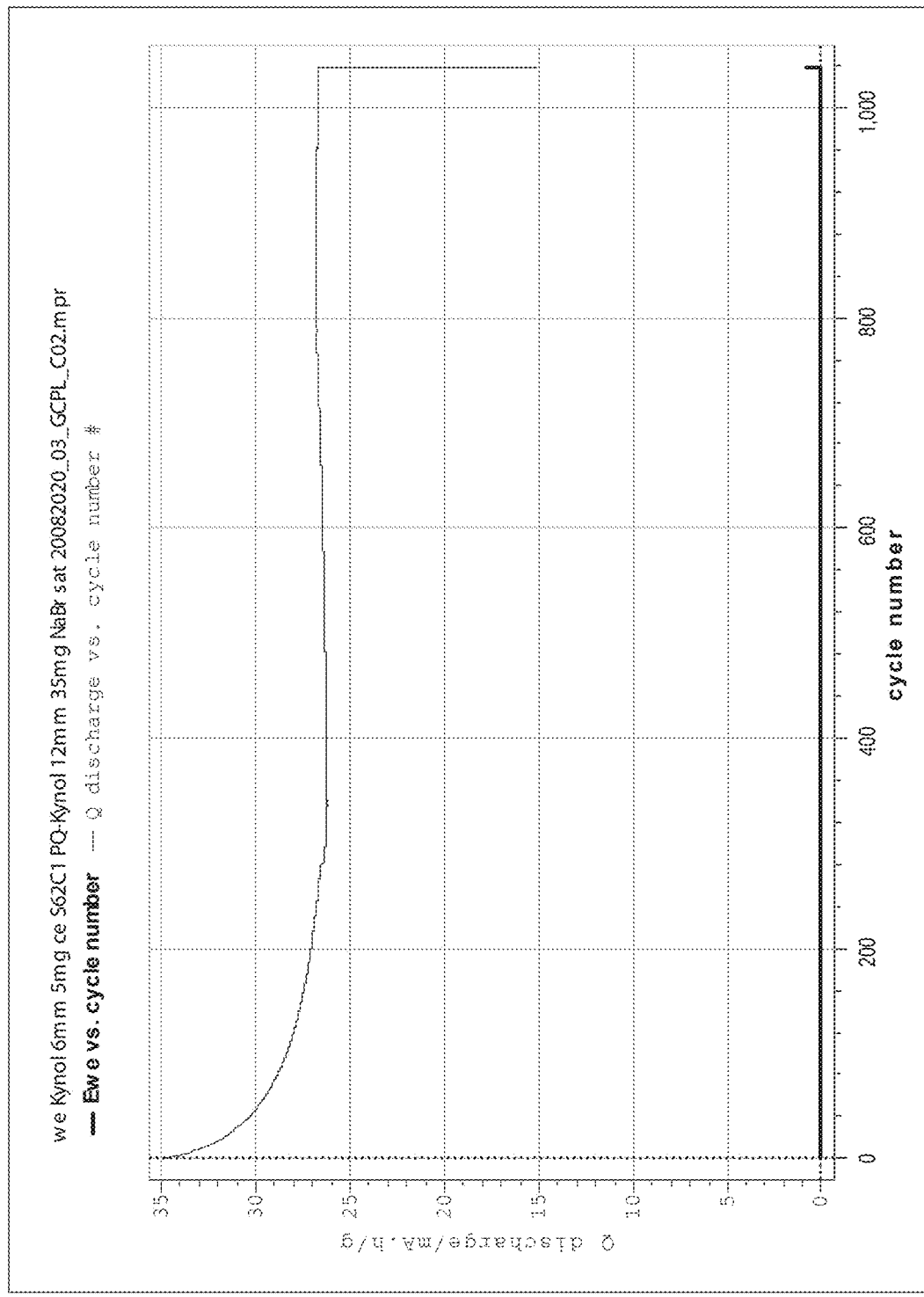

FIGS. 17A-C describe the testes performed in a two electrodes configuration cell with saturated sodium bromide electrolyte solution. The working electrode was the commercial, unmodified Kynol® cloth (6 mm in diameter; weight of 5 mg). The counter electrode was the PQ-grafted carbon cloth (12 mm in diameter; weight of 35 mg). Voltammograms produced at scan rates of 1 mV and 5 mV are given in FIG. 17A (red and blue lines, respectively). For the galvanostatic measurement, a current density of 1 A/g was applied. The results shown in FIG. 17B indicate galvanostatic charge-discharge voltage profile of a full cell. Performance over prolonged cycling (1000 cycles) is illustrated in FIG. 17C, indicating an initial discharge capacity of 35 mAh/g and energy density of 35 Wh/Kg.

Figure 18A:
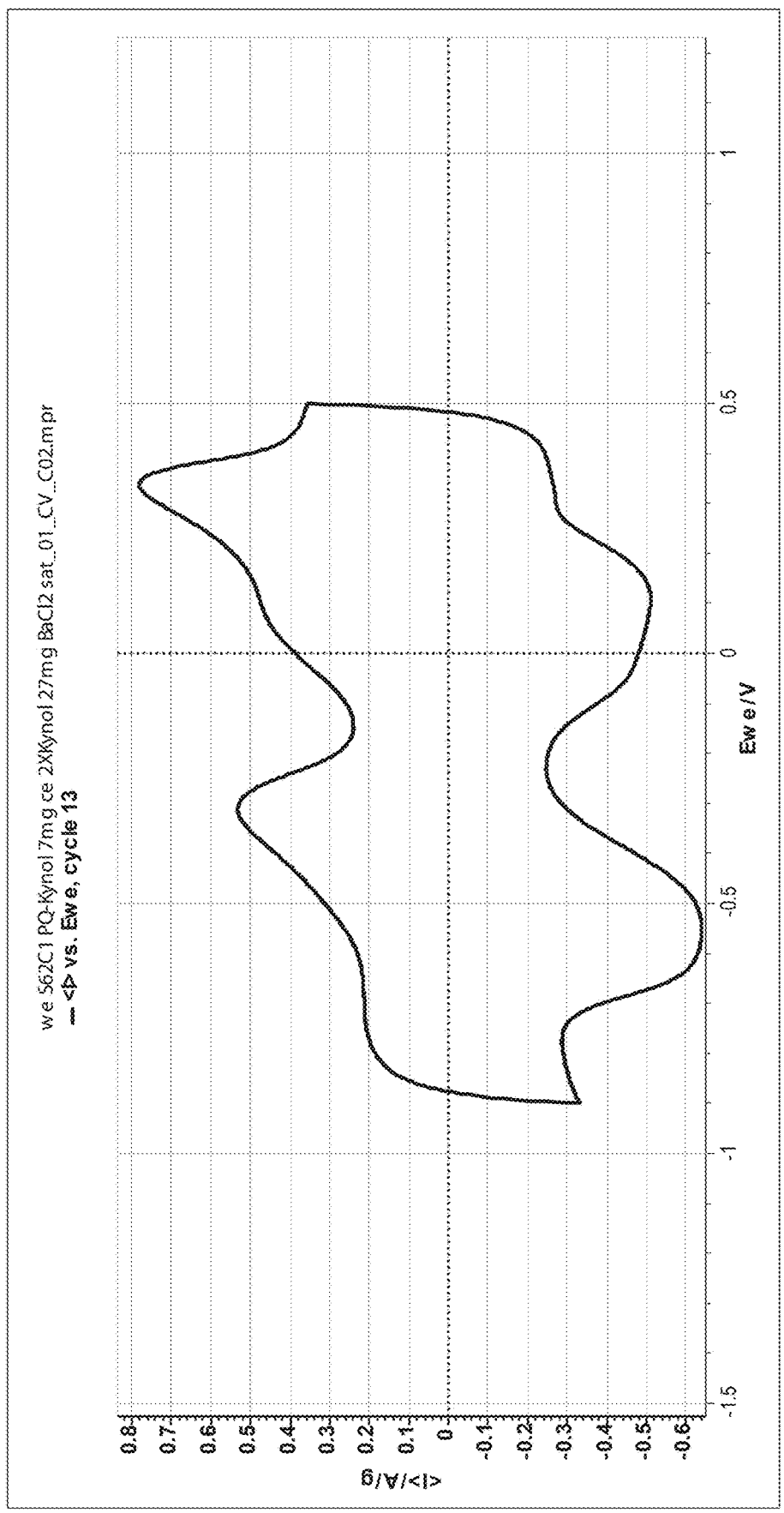
FIG. 18A-18C: Voltametric (FIG. 18A) and galvanostatic (FIGS. 18B-18C) analyses of a PQ-grafted carbon electrode in a three electrodes configuration cell with saturated barium chloride electrolyte solution.
Figure 18B:
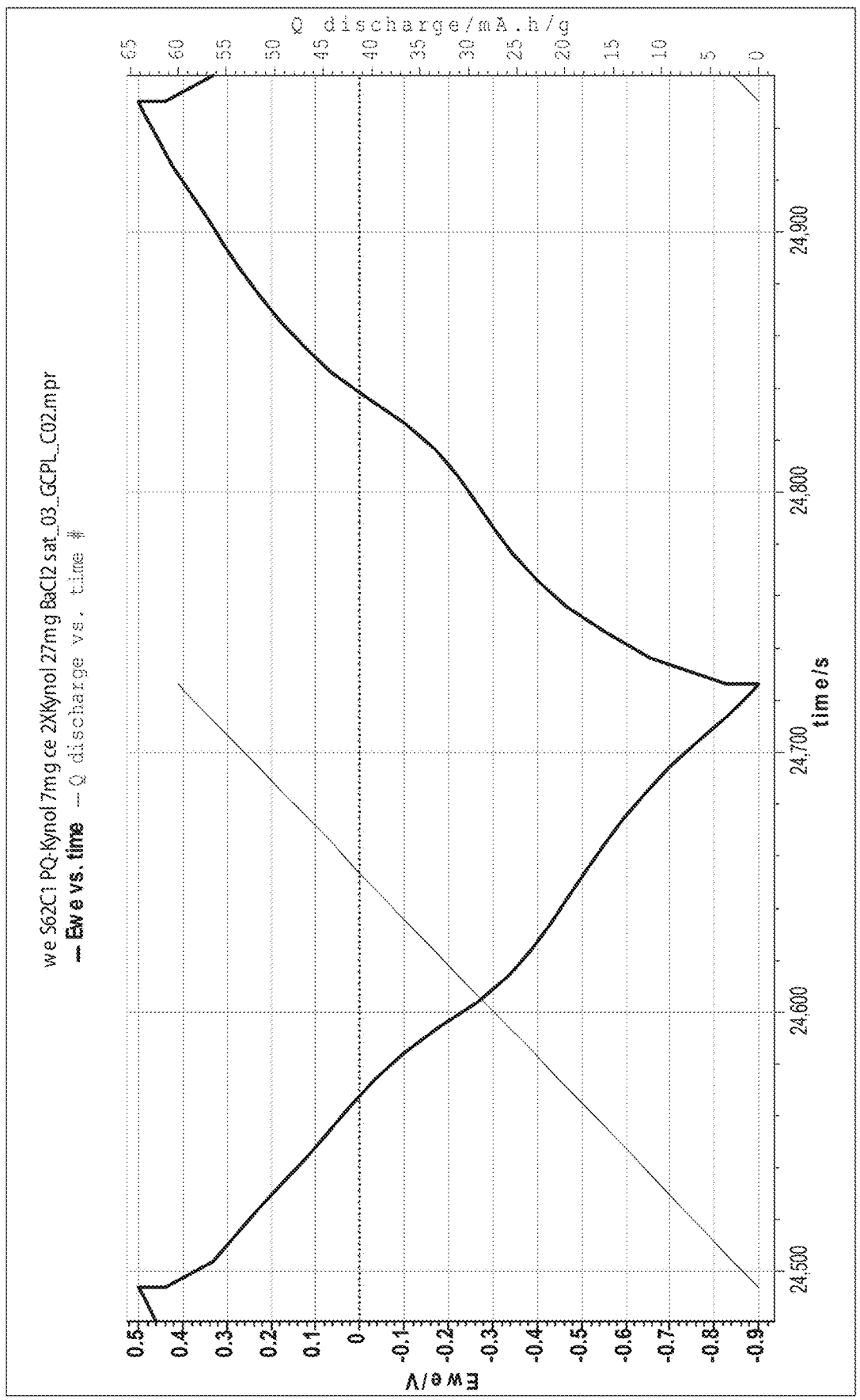
Figure 18C:
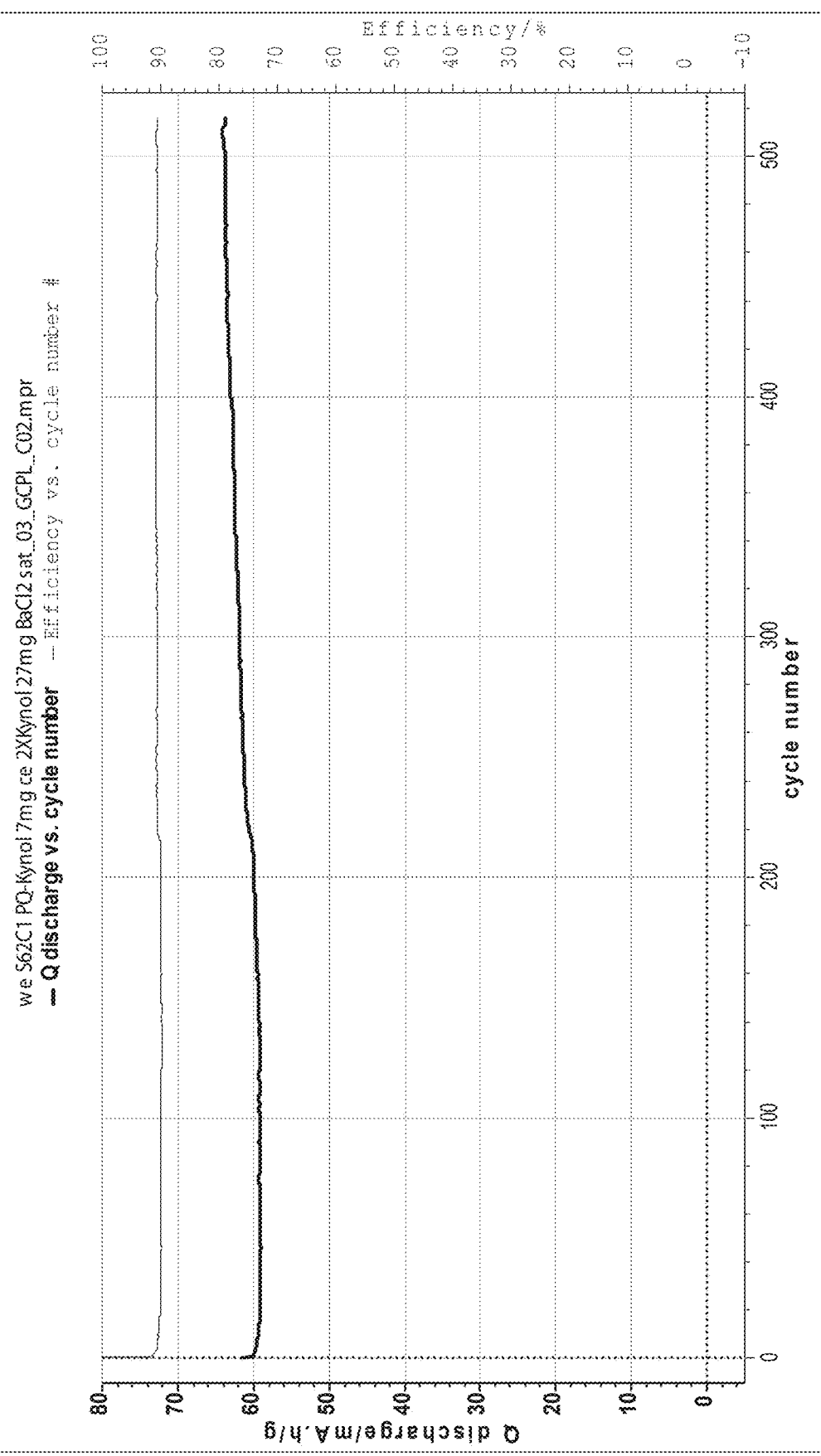

FIGS. 18A-C describe the testes performed in the three-electrode cell with saturated barium chloride electrolyte solution. The working electrode was the PQ-grafted Kynol® carbon cloth (6 mm in diameter; weight of 7 mg). The counter electrode was the commercial Kynol® carbon cloth (12 mm in diameter; weight of 27 mg). Voltammogram produced at scan rate of 5 mV is shown in FIG. 18A, indicating the contribution of the redox reactions. From FIG. 18B (obtained with current density of 1 A/g), 60 mAh/g discharge capacity is obtained. Discharge capacity and efficiency versus cycle number up to 500 cycles are plotted in FIG. 18C, indicating a stable performance over prolonged cycling.

The invention claimed is:

1. A process for preparing surface-modified carbon, comprising adding carbon material to a solution of a reaction product of primary aromatic amine and excess molar amount of nitrite source, and recovering surface-modified carbon bearing redox-active sites.

2. A process according to claim 1, comprising combining in a solution a primary aromatic amine and excess molar amount of nitrite source, wherein said excess is at least 10 molar percent (1.10 molar equivalents of nitrite source), and adding carbon material to said solution.

3. A process according to claim 2, wherein the excess molar amount of nitrite source is from 50 to 200 molar percent (from 1.5 to 3 molar equivalents).

4. A process according to claim 1, wherein the solution is an organic solution.

5. A process according to claim 1, wherein the solution is acidic aqueous solution.

6. A process according to claim 1, wherein the primary aromatic amine is represented by the formula $(RED)_n$-Ar—$(NH_2)_m$, in which:
Ar represents an aromatic or conjugated system comprising one or more rings;
m is 1 or 2;
RED represents a functional group capable of undergoing redox reactions, optionally in a protected form, wherein RED is either attached to one or more rings of Ar, or forms part of such rings;
n is the number of RED groups in the primary aromatic amine, n=1, 2 or 3, the RED groups being the same or different.

7. A process according to claim 6, wherein Ar is a benzene ring, m=1, the RED group is in a protected form, such that the primary aromatic amine is $(OP_1)_n$-substituted aniline, wherein $P_1$ is alkyl.

8. A process according to claim 7, wherein $P_1$ is methyl and n equals 3, such that the $(OP_1)_n$-substituted aniline used is 3,4,5-trimethoxyaniline:

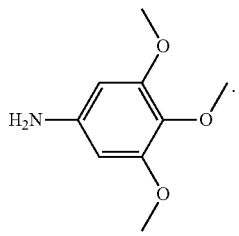

9. A process according to claim 8, further comprising:
collecting a carbon material having 3,4,5-methoxybenzene groups attached to its surface:

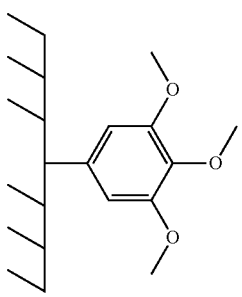 [SMILES: CCC(C)C(C)C(c1cc(OC)c(OC)c(OC)c1)C(C)C(C)CC]

and chemically or electrochemically cleaving the protecting groups, to recover surface-modified carbon material bearing 3,4,5-trihydroxybenzene groups:

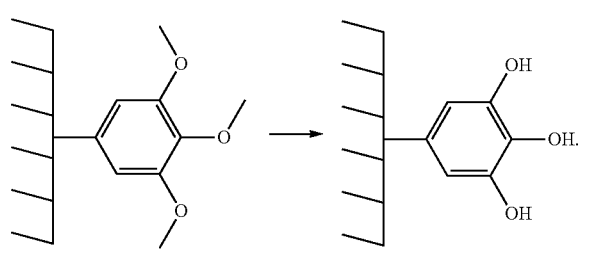 [SMILES: CCC(C)C(C)C(c1cc(OC)c(OC)c(OC)c1)C(C)C(C)CC ; CCC(C)C(C)C(c1cc(O)c(O)c(O)c1)C(C)C(C)CC]

10. A process according to claim 6, wherein Ar is a benzene ring, m=1, said benzene ring being substituted with two different RED groups, both in a protected form, such that the primary aromatic amine is $(OP_1)_{n1}$-$(COOP_2)_{n2}$-substituted aniline, where $OP_1$ is protected hydroxyl, $COOP_2$ is protected carboxylic acid, and $n_1$ and $n_2$ are independently 1 or 2.

11. A process according to claim 10, wherein $P_1$ is —Si(CH$_3$)$_3$ and $P_2$ is CH$_3$.

12. A process according to claim 10, comprising isolating the carbon material and cleaving the protecting groups $P_1$ and $P_2$ to restore the hydroxyl and carboxylic acid redox active functionalities, thereby recovering surface-modified carbon bearing redox-active sites.

13. A process according to claim 6, wherein Ar consists of conjugated polycycles composed of fused six-membered rings, such that $(RED)_n$-Ar—$(NH_2)_m$ is an amino-substituted quinone, where RED is provided by the keto functionality incorporated in the quinone system.

14. A process according to claim 13, wherein the quinone is selected from the group consisting of 2-amino-anthraquinone, 2-amino-9,10-phenanthrenequinone; and 2,7-diamino-9,10-phenanthrenequinone.

15. A process according to claim 14, wherein the quinone is 2,7-diamino-9,10-phenanthrenequinone:

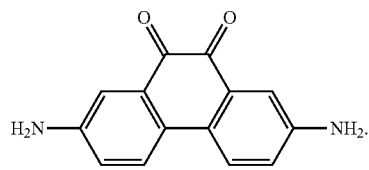 [SMILES: Nc1ccc2c(c1)C(=O)C(=O)c1cc(N)ccc1-2]

16. A process according to claim 6, wherein Ar comprises a biphenyl system with a linker connecting the phenyl rings and m=2, such that the primary aromatic amine is of the formula $_2$HN—C$_6$H$_5$—Z—C$_6$H$_5$—NH$_2$, where Z indicates the linker incorporating RED groups.

17. A process according to claim 16, wherein $_2$HN—C$_6$H$_5$—Z—C$_6$H$_5$—NH$_2$ is:

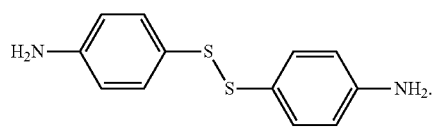

18. A process according to claim 6, wherein the primary aromatic amine is:

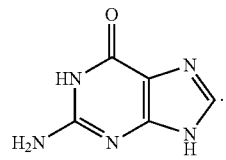

* * * * *